Nov. 22, 1966   W. M. DAVIS   3,286,915
PROGRAMMING TERMINAL
Filed June 23, 1964   12 Sheets-Sheet 1

INVENTOR
WILBUR M. DAVIS

BY
ATTORNEY

Nov. 22, 1966  W. M. DAVIS  3,286,915
PROGRAMMING TERMINAL

Filed June 23, 1964  12 Sheets-Sheet 2

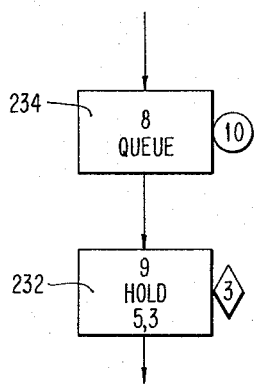
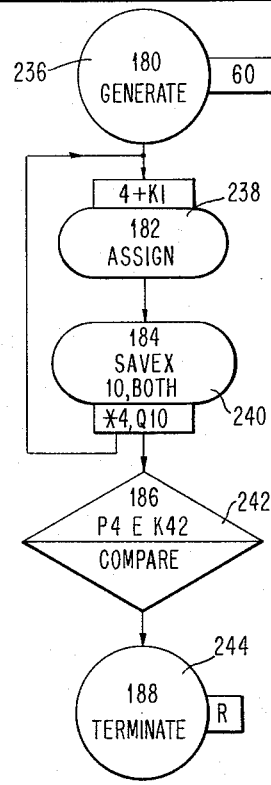
FIG. 7
FIG. 4
FIG. 5
FIG. 6
| *LOCATION | NAME | X | Y | Z | SELECTION MODE | NEXT BLOCK-A | NEXT BLOCK-B | MEAN TIME | MODIFIER |
|---|---|---|---|---|---|---|---|---|---|
| 1 2 | 7 | 19 | 25 | 31 | 37 | 43 | 49 | 55 | 61 |
| 180 | GENERATE | 60 | 1 | | | 182 | | | |
| 182 | ASSIGN | 4+ | K1 | | | 184 | | | |
| 184 | SAVEX | 4 | Q10 | | BOTH | 186 | 182 | 10 | |
| 186 | COMPARE | P4 | E | K42 | | 188 | | | |
| 188 | TERMINATE | R | | | | | | | |
| *MAIN DIAGRAM WHERE QUEUE FORMS | | | | | | | | | |
| 8 | QUEUE | 10 | | | | 9 | | | |
| 9 | HOLD | 3 | | | | 10 | | 5 | 3 |

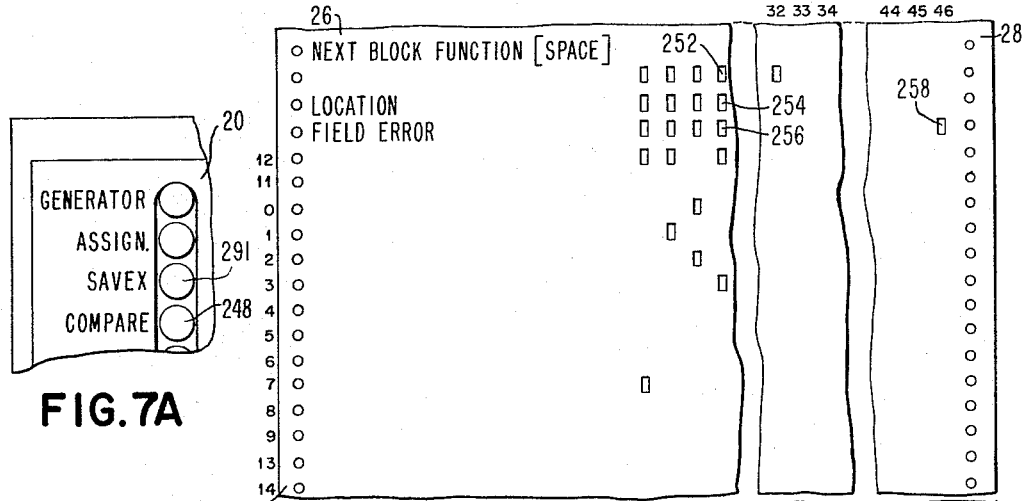
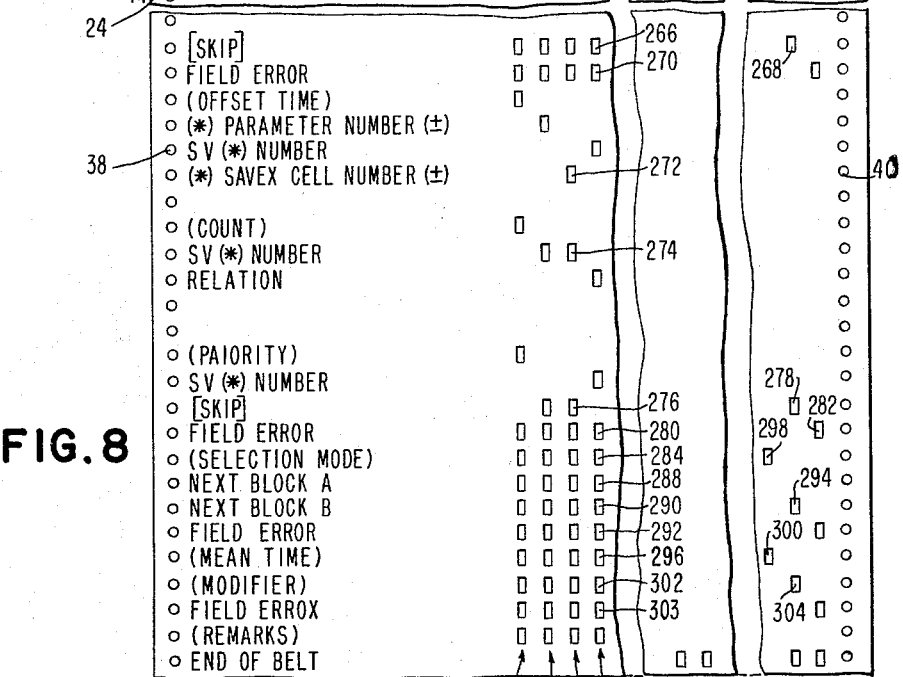
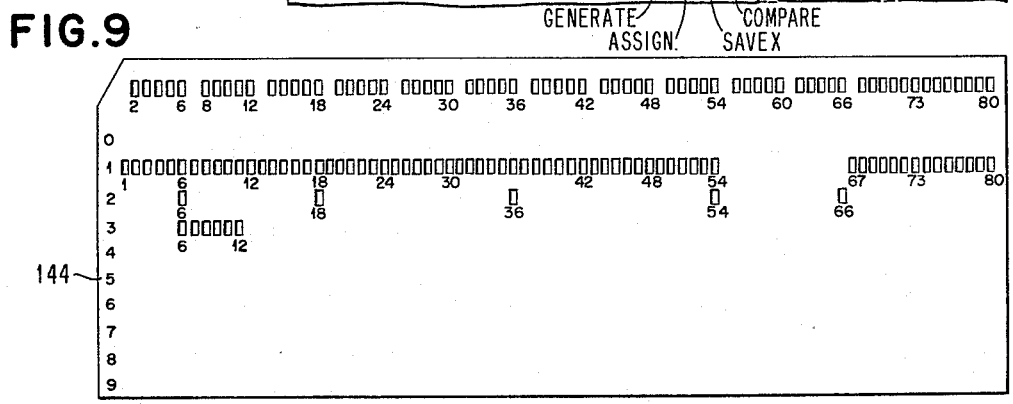

Nov. 22, 1966   W. M. DAVIS   3,286,915
PROGRAMMING TERMINAL

Filed June 23, 1964   12 Sheets-Sheet 6

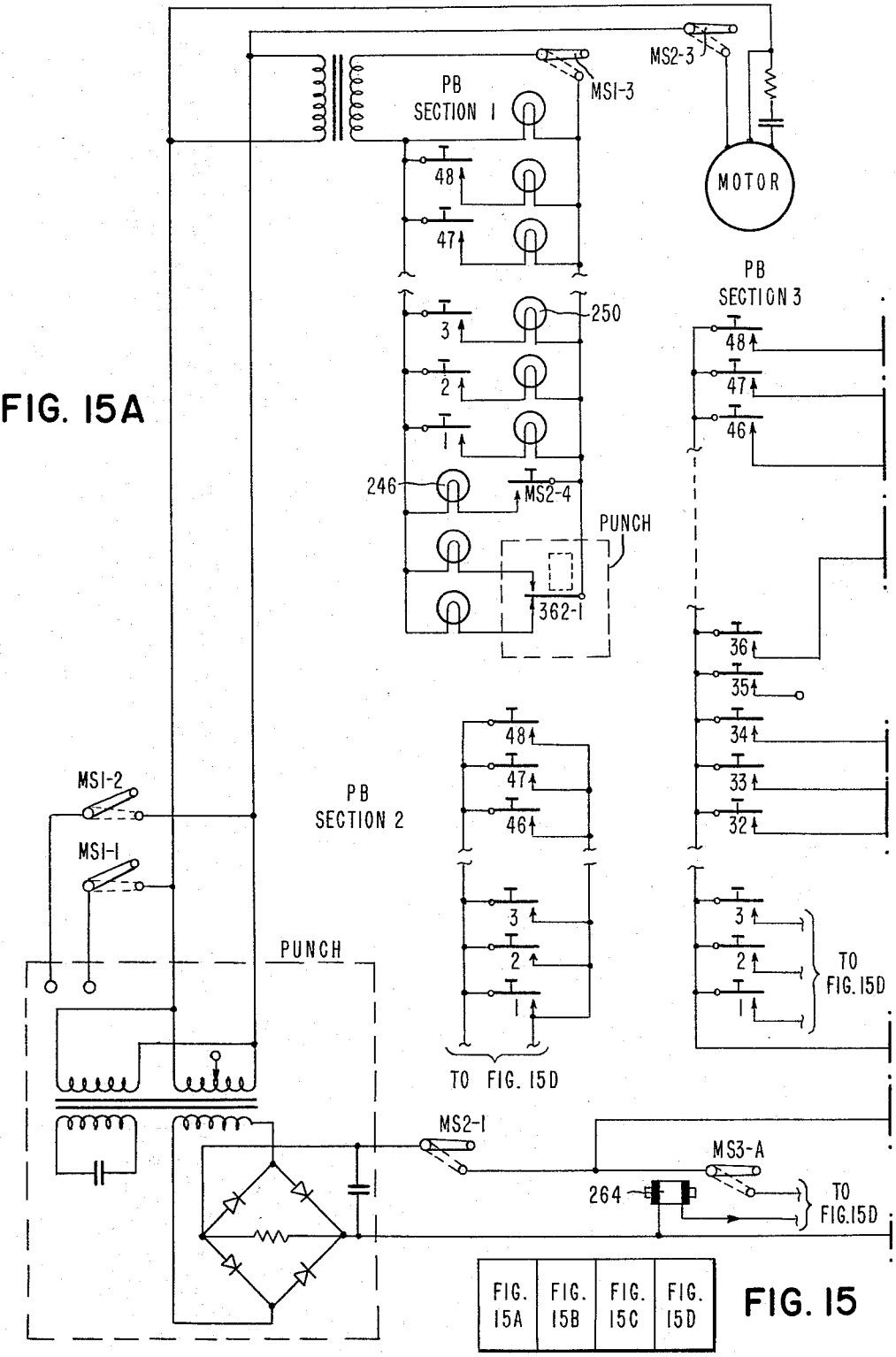

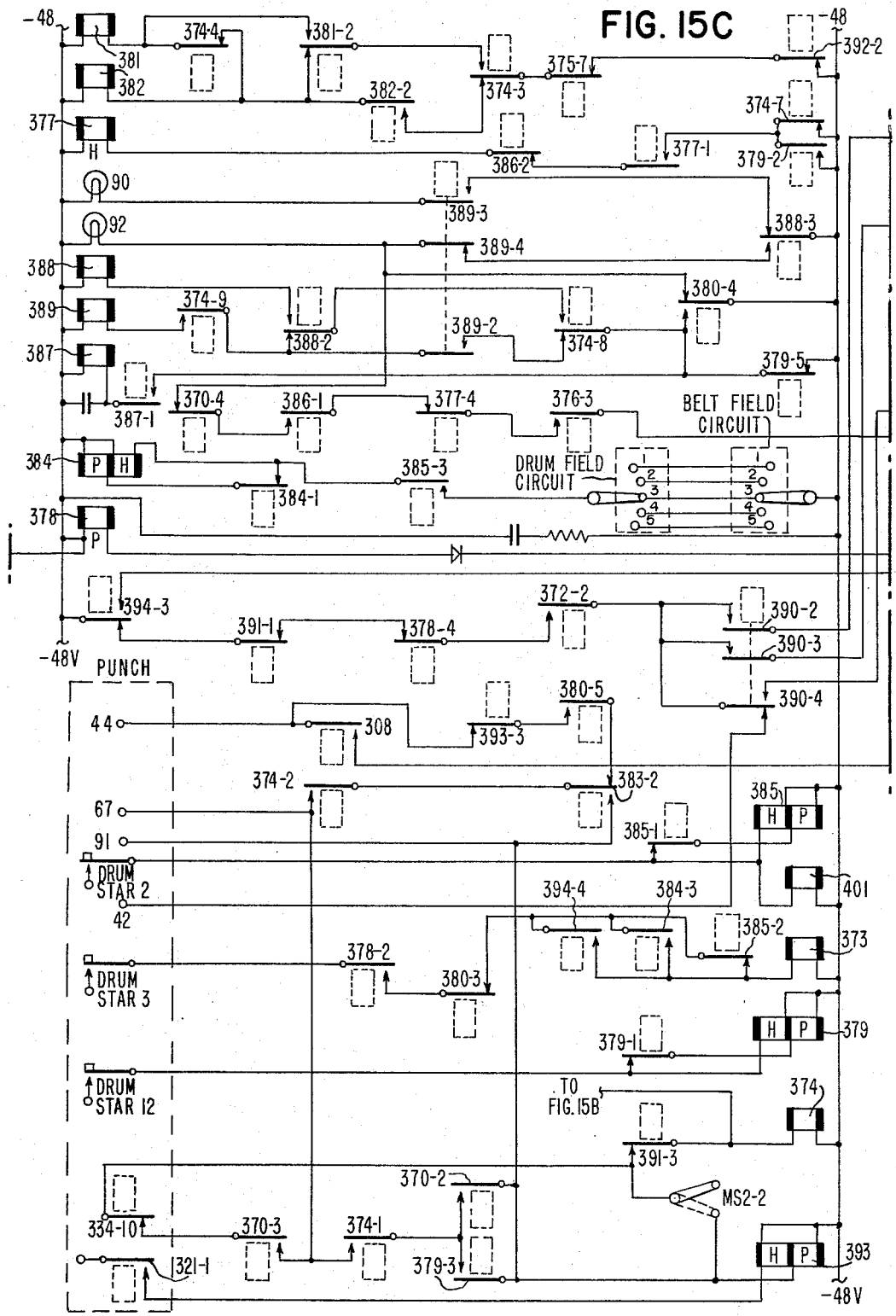

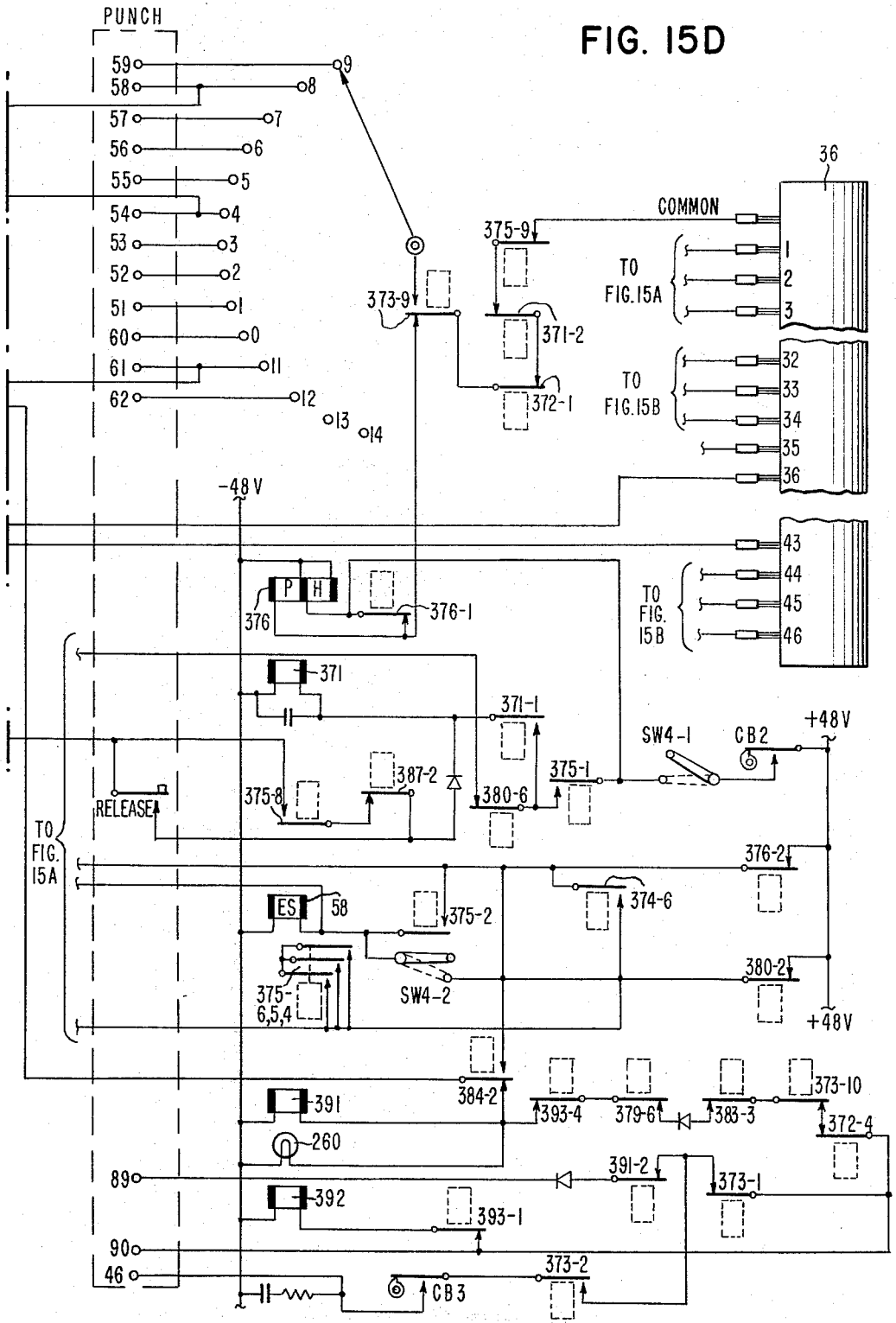

United States Patent Office 3,286,915
Patented Nov. 22, 1966

3,286,915
PROGRAMMING TERMINAL
Wilbur M. Davis, Brooklyn, N.Y., assignor to International Business Machines Corporation, New York, N.Y., a corporation of New York
Filed June 23, 1964, Ser. No. 377,260
32 Claims. (Cl. 234—17)

This invention relates to a programming terminal, particularly a terminal comprising data input means for data processors of all kinds.

More particularly, the invention relates to a data processor input system which eliminates several steps of the conventional programming processes and which is capable of prompting a programmer concerning successive data requirements of a data processing system or a computer.

According to conventional procedure and by the use of certain computer programming languages, the programmer prepares a block diagram to satisfy the requirements of his problem. A typical approach might involve a technique such as that employed in connection with an all-purpose simulator. Once the block diagram is completed, the programmer prepares the data for entry into the data processor. Ordinarily, this involves the preparation of coding sheets. Here the data in each block of the program is transferred into a single line of the coding sheet according to set field assignments. Since different blocks require different data, it is often not feasible to head each block with an accurate designation of the data required. Therefore, the programmer must refer to a master list to ascertain the proper field for the data. Once the coding sheets have been prepared, they are ordinarily given to a key punch operator who then transposes the data to punch cards by punching each line on the coding sheet into a separate card. Since key punching is a mechanical operation, and since the key punch operator ordinarily has little understanding of the coding system, errors are frequent in both the transposition of data and in the displacement of data into an improper field.

The programming terminal herein, in its broad concept, comprises a device adapted to the direct entry of data into computer and data processing systems, thus permitting the programmer to enter data into the system directly from a block diagram or a flow chart, thereby eliminating the need for reference to master lists and the need for coding sheets. Moreover, real-time communication between data processors and programmers can be achieved by direct connection of the terminal with the data processors.

The terminal has been developed in conjunction with a key punch and resort is had to this combination for purpose of specific illustration. In this particular combination, the terminal possesses some unique virtues in the preparation of program cards directly from a block diagram or a flow sheet. Moreover, the invention recognizes that the programmer is not a key punch operator and that the key punch operator has little appreciation for programming requirements and techniques. As stated, these shortcomings have heretofore led to frequent programming errors, the elimination of which is one of the principal purposes of the invention.

Present day data input methods require some sort of keying. This, nevertheless, involves more than the mere striking of keys. For example, the operator must be aware of the proper sequencing of the data to be entered. When the programming terminal herein is attached to an IBM Type 026 Key Punch, or other data processor, such as a computer or general data processing system, the entry of data is simplified by providing constant prompting of the operator as to the data requirements. Moreover, when the terminal is used as a key punch control, it automatically keeps track of the card field in which the punch is located, skipping fields where applicable to speed the operation and to minimize nonproductive time.

In one application of the invention, the programmer's block diagram is placed on a desk-type surface of a prompter unit. The programmer is prompted by short instructions as to the next data requirements which appear in an illuminated slot at the top of the prompter unit. At the outset, the programmer notes the first block of his chart. He then refers to a push button panel on an operator control unit and finds a push button corresponding to the block function. When he pushes the button, the name of the first block is automatically entered into the data processor, e.g. the punch, in the specific combination shown, automatically punches the name of the block into the punch card. The prompting inquiry next under the prompter slot will ask the programmer for the specific data which is now to be entered. Accordingly, the programmer keys in the required data and then strikes a key on a control keyboard. Immediately, the next required instruction appears in the prompter window to alert the programmer. When used as a key punch adjunct, the punch card is also advanced to the next proper field as the new instruction appears. This process is continued until the last of the program data has been entered into the data processor. The terminal then asks the programmer to push the button on the operator control panel for the next block. Here again, if the terminal is used in connection with a key punch, it will signal the punch to start a new card.

In addition to the presentation of sequential programming inquiries for the guidance of the programmer, the terminal is also designed, when specifically employed in connection with a card punch, to perform a number of operational functions which are necessary and desirable such as the maintenance of in-phase operation of the terminal and punch. When the terminal is directly connected with a computer or data processing system similar functions will be readily provided, if necessary or desirable, by those skilled in the art who are familiar with the specific disclosure herein. These operations, and others, together with the specific nature of a suitable embodiment of the invention will become clear as the description thereof is read in light of the drawings.

In the drawings, like reference numerals indicate like parts, and:

Figure 2:
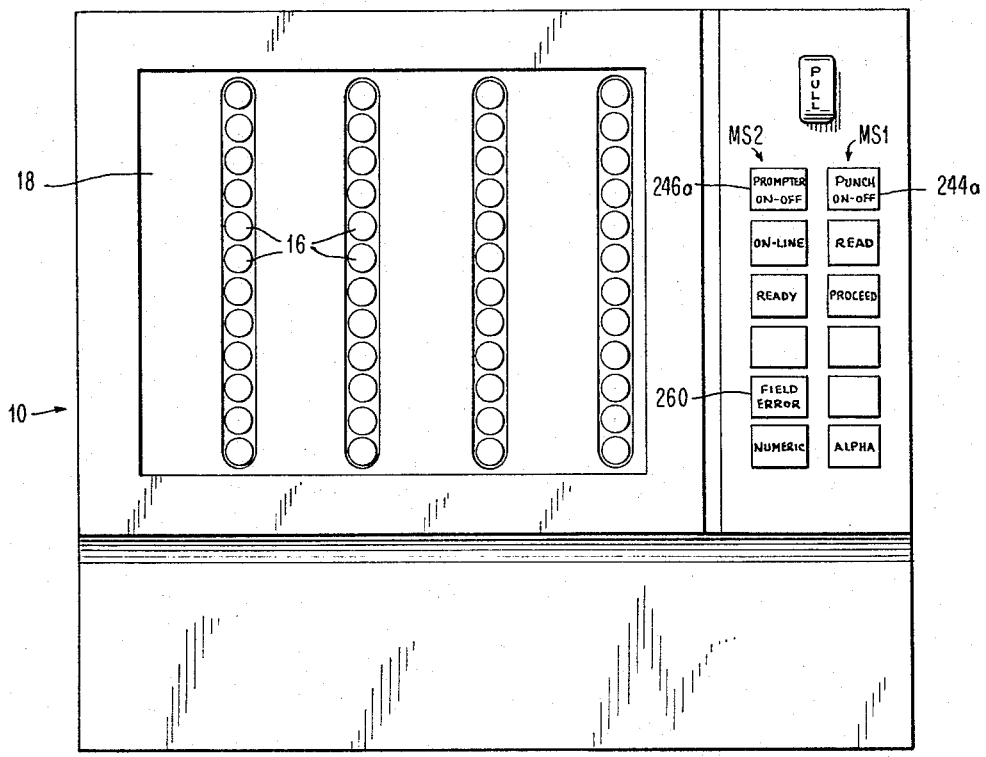
FIG. 2 is a facial elevational view of the push-button control panel.
Figure 10:
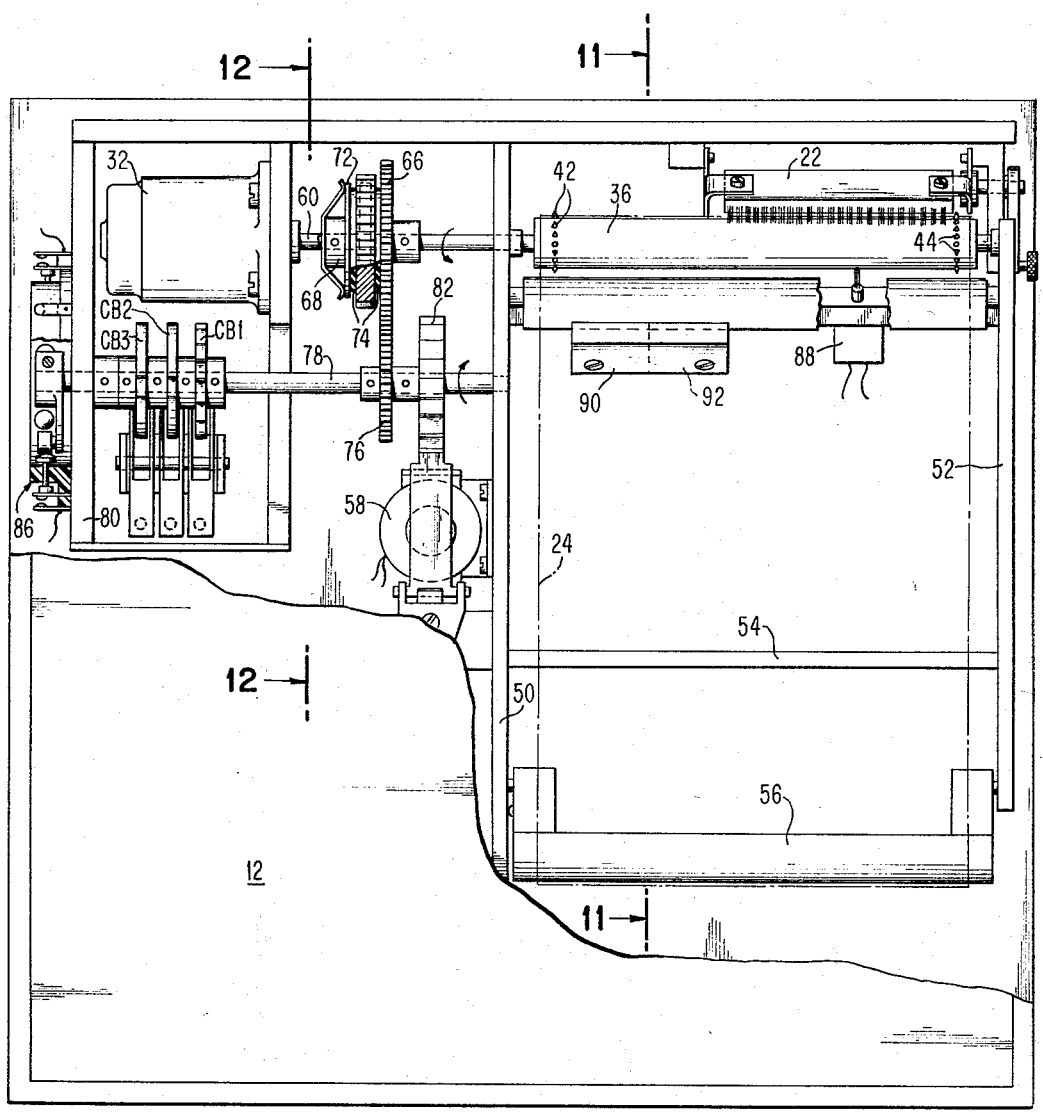
Figure 11:
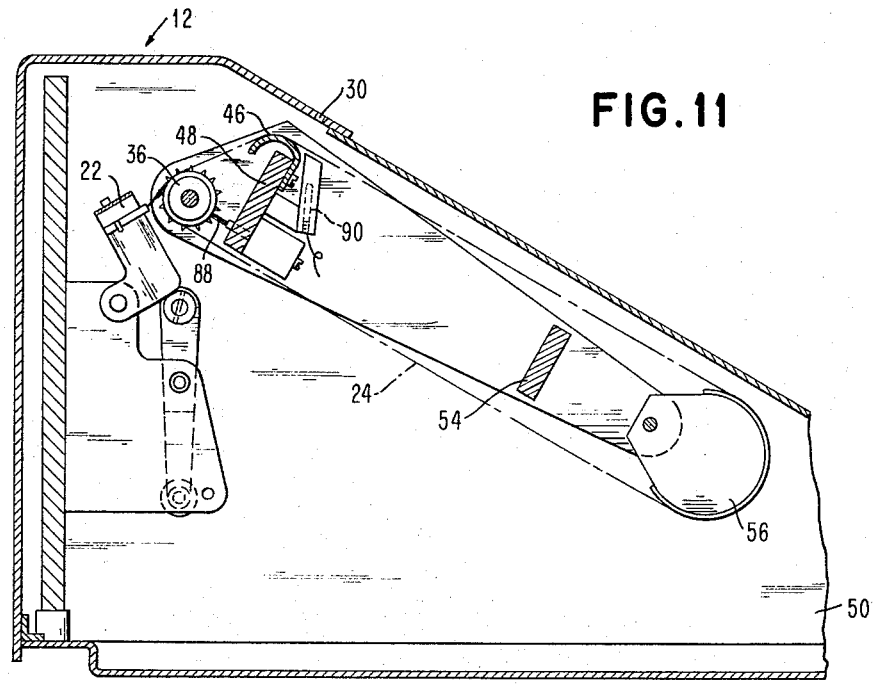
Figure 12:
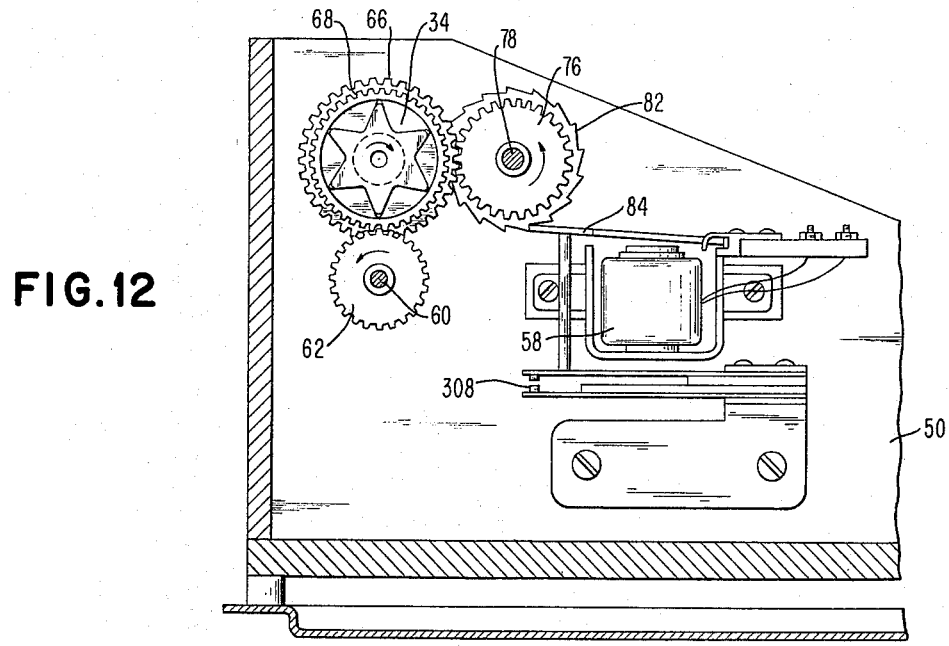
Figure 13:
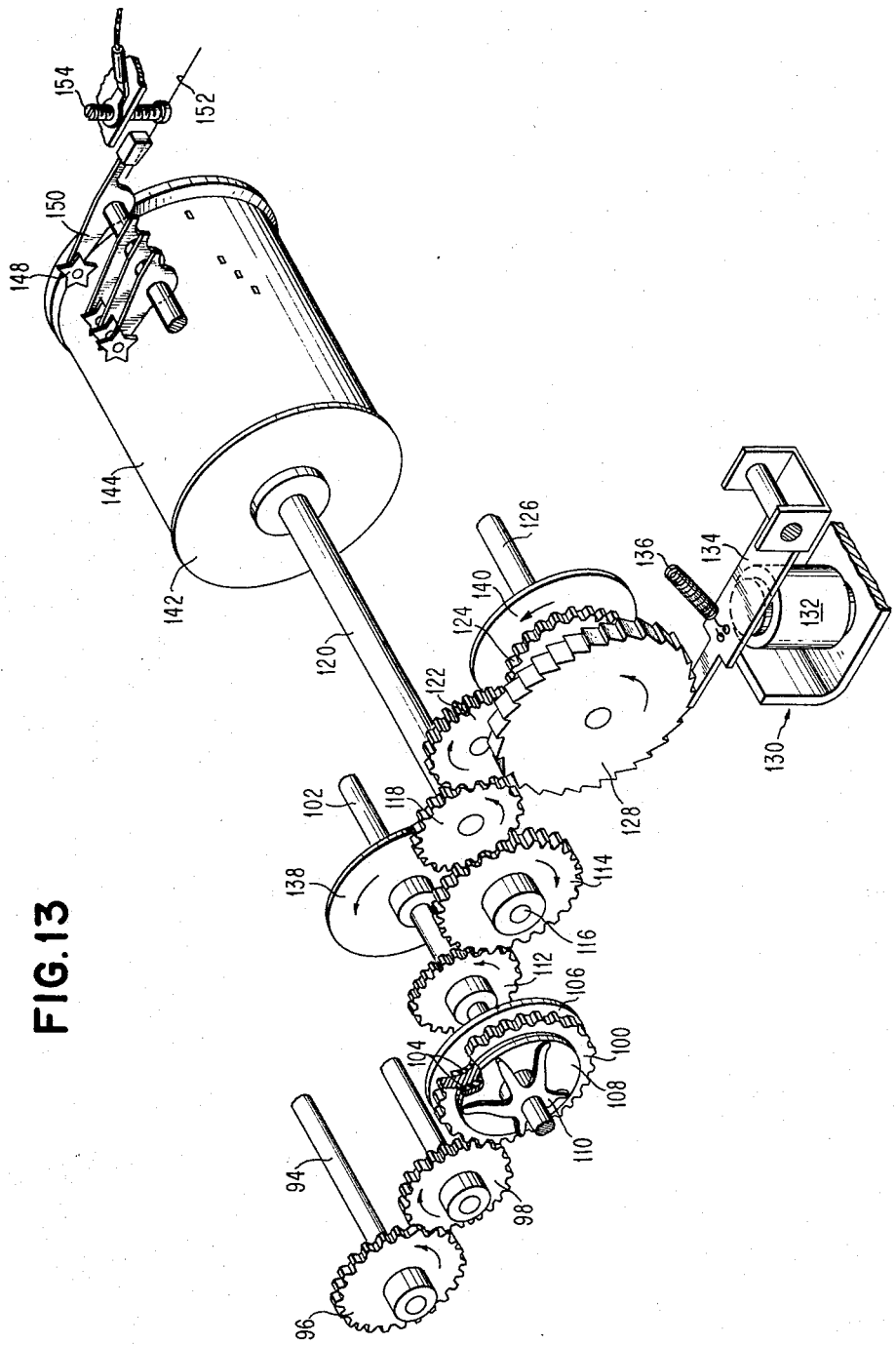
Figure 14:
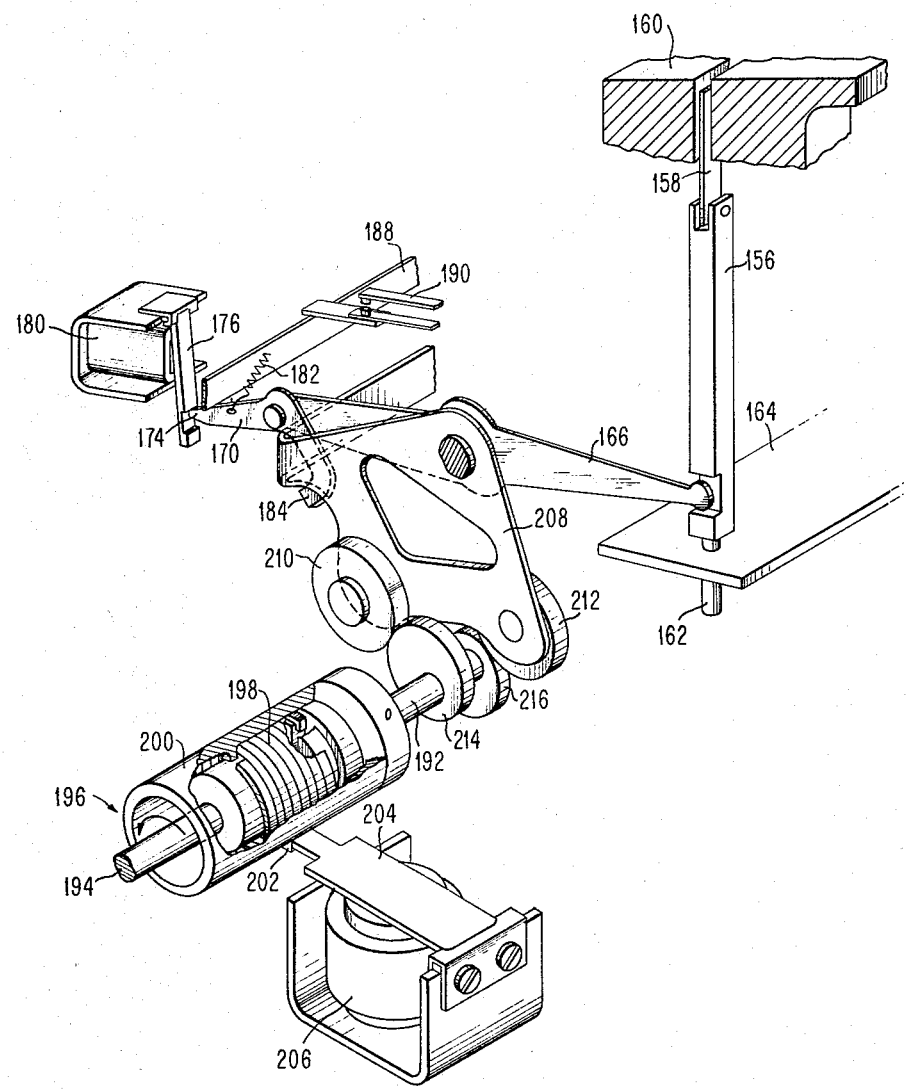
Figure 15B:
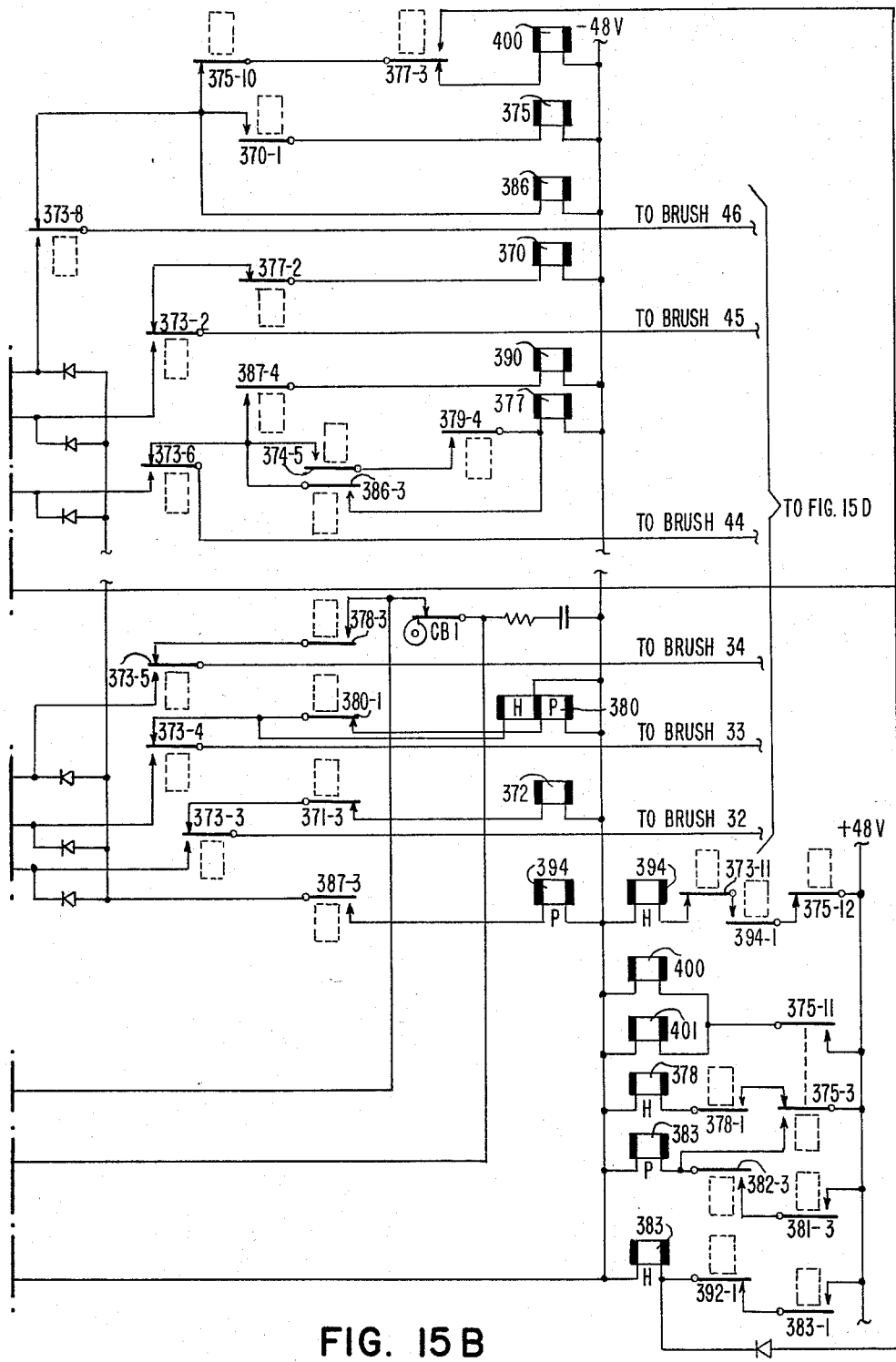

FIGS. 4 and 5 comprise remote portions of a program block diagram;

FIG. 6 is a typical program code sheet derived from the block diagram of FIG. 5;

FIG. 7 is a punch card having punched therein the data shown at line 3 of the code sheet of FIG. 6;

FIG. 7A is a fragmentary view of one corner of the push-button control panel of FIG. 2 showing thereon functions associated with the several push-buttons shown;

FIG. 8 is a fragment of a program tape which is formed as an endless belt;

FIG. 9 represents a punch program card prepared for the automatic control of certain of the functions to be described;

FIG. 10 is a plan view of the prompter unit, certain parts of the cover being removed to show underlying structure;

FIG. 11 is a cross-sectional view on line 11—11 of FIG. 10;

FIG. 12 is a cross-sectional view on line 12—12 of FIG. 10;

FIG. 13 is a perspective view of card punch mechanism adapted to feed a punch card through a punch station and showing also an associated punch program card drum;

FIG. 14 is a perspective view of elements of a card punch and associated control mechanism;

FIG. 15 is a layout diagram showing the relation of FIGS. 15A through 15D comprising an electrical control circuit diagram; and FIGS. 15A through 15D comprise the electrical control circuit diagram.

The invention is applicable to any fixed field, fixed format computer language that has the characteristic of possessing a fixed operator (the functions represented in any one of the blocks of a programmer's diagram, as in FIG. 5) defining the nature of the data to be entered on the card.

The fixed format language most usefully employed is such that the operator which describes the function that is to be performed with the data appears in a fixed field. Associated with each operator may be a series of unique entries and common entries for all entries, in some combination. An example of this kind of data, as suggested, is the input language of the General Purpose Simulator II (GPS II), of which the program segments of FIGS. 4 and 5 are exemplary.

The diagrams of FIGS. 4 and 5 may be taken as the representation of flow of customers through a supermarket check-out counter 232 (FIG. 4). A queue 234 will measure the customers waiting at the check-out counter 232. At this time it may be desired to sample the length of the queue 234 every ten minutes after the first hour of an eight hour day. Assuming that the cashier can service one person every five minutes with a square distribution of plus or minus three minutes. To program this simulation, the person analyzing the problem will generate a block diagram or flow chart, such as shown in FIGS. 4 and 5.

The input queue 234 in FIG. 4, in this sample, is representative of the customers coming with some random distribution and in arrival time to the check-out counter. The actual function of measuring the queue of customers on the cashier is done by the operations represented by the several blocks of FIG. 5, which will be explained in greater detail. Block 180 is a GENERATE block which creates one particle which will come into the system at the end of the first hour. Flow will be from the generate operation to an ASSIGN block 182 which adds 1 to parameter 4, which was initially 0. It then proceeds to a SAVEX block 184 which saves the length of the queue 10 in the SAVEX indicated by parameter 4. The particle then spends ten minutes in the SAVEX block and then tries to move into a COMPARE block 186 where parameter 4 is now tested to determine whether it is equal to 42. Since the parameter 4 is not equal to 42, it returns to ASSIGN block 182 where 1 is added to parameter 4, making it 2. This operation is repeated every ten time units, measuring queue 10 and saving it in consecutive SAVEXES 1 through 42. When parameter 4 becomes equal to 42, COMPARE block 186 allows the particle to proceed through the COMPARE block 186 to a TERMINATE block 188 which terminates this particle. SAVEXES 1 through 42 now contain the queue length sampled every ten minutes over the seven hour period.

The analyst, in conventional practice, will transcribe his flow chart representation of the supermarket problem to a coding sheet, so that it may be key punched into punch cards for entry into the computer. He will write down all of the information that appears in the flow chart in the appropriate fields on the coding sheet. FIGURE 6 is representative of a coding sheet in which the location, name and data for each of the successive flow diagram blocks is represented on successive lines of the coding sheet.

This operation can be illustrated by way of example with reference to the first line (180) of the coding sheet of FIG. 6. The analyst will write the generate block's name (FIG. 5) into the name field. He will set the offset time of the generate block to sixty minutes. He will usually refer to an Operation Manual to determine the proper field for the offset time, if he had not previously committed the location to memory. In this instance, the offset time is placed into the "X" field. The programmer will then set the count of the number of particles to 1. Again, he will make reference to his Operation Manual to determine that field "Y" is designated to receive this count. He will then consider the flow of his model and find the next block to be number 182 which will be entered into the "next block A" field. This process is repeated for each of the blocks involved in the flow chart until the model has been completed. In the present practice, as stated the code sheet is then given to a key punch operator who prepares a punch card for each line of the code sheet.

For the purposes of more fully explaining the operation, reference is made to FIG. 7, wherein the SAVEX operation of block number 184 has been punched into a conventional punch card. This card is divided into a number of fields, each with a fixed number of columns, e.g. 6 card-columns per field.

The LOCATION field, columns 2 through 6, receives the number 184 which has been assigned to the SAVEX block. The name field, columns 7 through 18, receives the name of the operator, e.g. SAVEX. The "X" field, columns 19 through 24, receives the SAVEX NUMBER *4 which is to receive the value indicated in the "Y" field, columns 25 through 30. The SAVEX number may be specified indirectly by a parameter, and the value may be any of a number of system variables; in this case, Q10. The "Z" field, columns 31 through 36, is not used by the SAVEX block. This field, however, may be applicable to other blocks, as, for example, the COMPARE block into which the value K42 would be entered. A selection mode field, columns 37 through 42, may contain a direction for exercising a choice between next block "A" and next block "B". If no selection mode is specified, the next block "A" is always specified. In the example under consideration, the selection mode "BOTH" has been stipulated. This instruction says, in effect, try next block "A" first, and if next block "A" conditions are not satisfied, then try next block "B".

The next block "A" instruction in the field between columns 43 through 48 is always required to identify the next block to which the particle is to proceed. Next block "B", columns 49 through 54, is the alternate particle exit which is employed when entry conditions to next block "A" are not met. The MEAN TIME field, columns 55 through 60, represents the time the particle is to spend in the SAVEX block, e.g. ten minutes. The MODIFIER field, columns 61 through 66, represents a unit of time by which the mean time may be modified. An example of a mean time and its modifier appear in the last line of the coding sheet of FIG. 6. Columns 67 through 80 comprise the remarks field.

Figure 1:
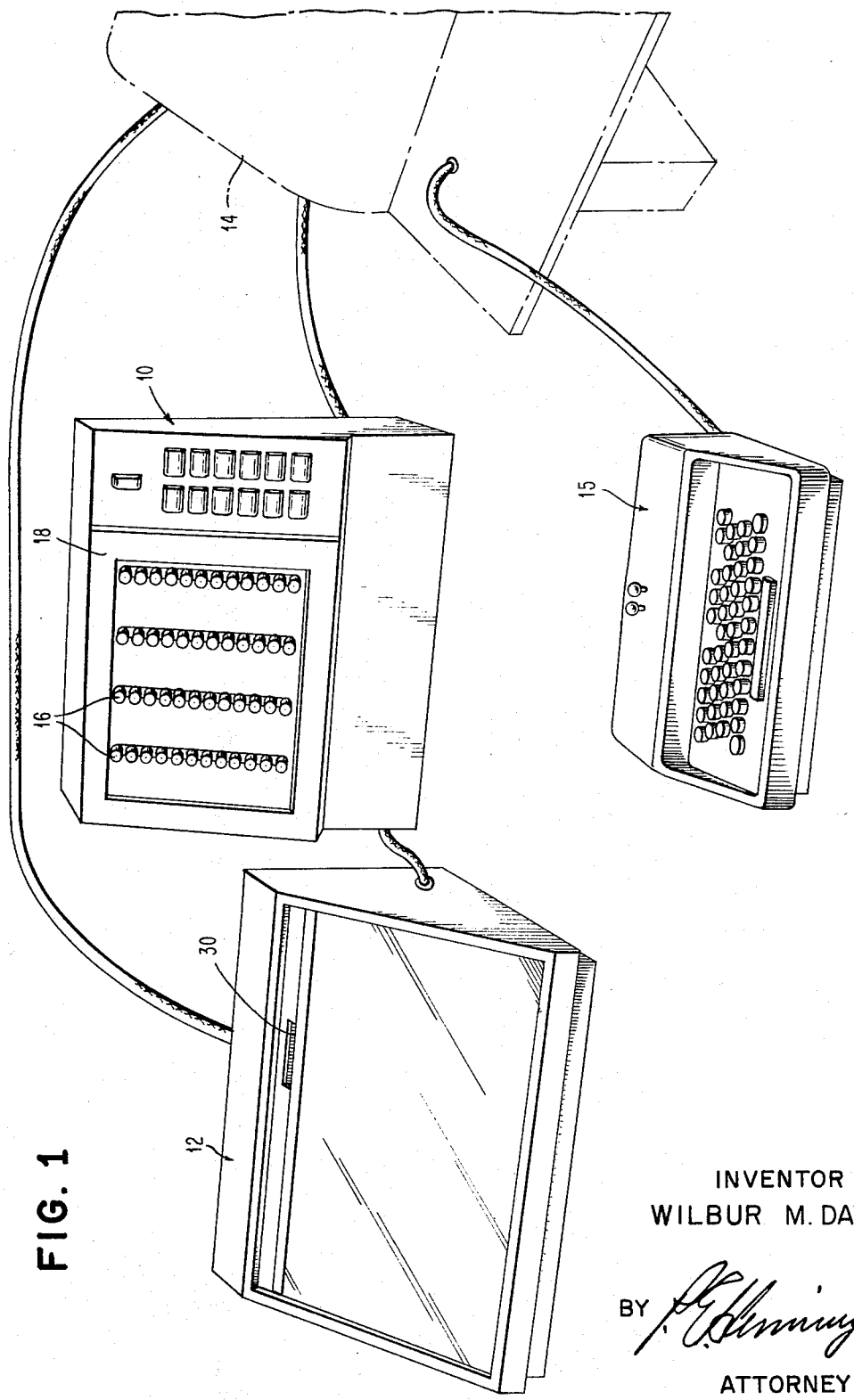
FIG. 1 is a perspective view showing a push-button control panel, a prompter unit, a card punch, and a punch control keyboard, comprising the principal physical units in which the invention herein is embodied.

In FIG. 1, a push-button panel 10 is connected between a prompter unit 12 and a key-operated punch 14. The latter may be an IBM Type 026 Punch, generally as shown in the E.W. Gardinor et al. United States Patent 2,647,-581, issued August 4, 1953. The punch is controlled by a punch control keyboard 15.

The push button control panel 10 is made up of four columns of push buttons 16, each column having twelve buttons. These buttons control the contacts shown in FIG. 15A, the nature and purpose of which will be explained in detail hereinbelow. Depressing a button 16 on the push button control panel 10 energizes a light associated with the button so depressed, so that the operator has a simple reference. Buttons, when depressed, are latched in depressed condition by mechanical conventional means until all data for a card has been entered, at which time they will be released. A hinged plexiglass cover 18 is provided for the push button area. The cover 18 may be opened to insert a sheet 20 bearing button designations as shown in the fragmentary view of FIG. 7A. The closed cover 18 retains the sheet in place.

Within the prompter unit 12 (FIG. 10) is a wire brush assembly 22 composed of forty-six standard wire sensing brushes. Each brush is wired to a separate push button in the push button control panel 10, so that when one of the push buttons 16 is depressed, its wire brush contact is automatically introduced into the active electric circuit. The brushes 22 are arranged to sense holes in an endless program belt 24 which is fed under the brushes.

The program belt 24 is an operative embodiment of the invention is a translucent Mylar structure about 8" wide and about 24" long. It is divided into an instruction section 26 (FIG. 8) along its left side, and into a punched hole section 28 along its right side. Along the left side 26 of the program belt 24 are printed all of the prompting instructions that might appear in any of the program blocks. It is these prompting instructions which will eventually appear one at a time in an illuminated slot 30 of the prompter (FIG. 1). The right side 28 of the program belt 24 is used to punch control holes which will be sensed by the brushes of the wire assembly 22. A motor 32 in the prompter unit (FIG. 10) is used to drive the program belt through a friction clutch 34 and a drum 36. The drum 36 is electrically conductive and it is electrically insulated from its shafts adapting it to serve as an element of the control circuit. The program belt 24 is provided with feed holes 38 and 40 along its opposite margins. These feed holes are accurately spaced for engagement by feed pins 42 and 44 at the opposite ends of the drum 36. While the program belt 24 is illustrated as being in the form of a closed loop, it is quite obvious that without substantial changes in the mechanism, it can be in the form of a reeled tape.

As shown by the dot-dash lines in FIG. 11, the program belt 24 is trained about the drum 36 from which its course is forwardly over a guide bar 46 attached to the upper edge of a transverse member 48. A second transverse member 54 (FIG. 10) extending between a pair of rigid frame members 50 and 52 serves to connect the frame members 50 and 52 at their forward end. A guide sleeve 56 is pivoted on the frame members 50 and 52 at the forward ends thereof. The sole support for the drum 36, the frame member 52 and the guide sleeve 56 is derived from the fixed frame member 50 in association with the transverse members 48 and 54 such that the belt frame comprised by these elements is accessible from the right, as viewed in FIG. 10. The program belt 24 can be associated with the drum 36 by inserting it from the right. This insertion is facilitated by rotating the sleeve 56 rearwardly on its pivots to effectively shorten the belt guide frame. When the belt has been inserted, the sleeve 56 in its normal position shown in FIG. 11 will maintain the proper amount of tension on the belt. When a program belt is in position, such as shown in FIG. 11, with the sprocket pins 42 and 44 engaging the belt feed holes 38 and 40, its movement under the brush assembly 22 under the influence of the drive motor 32 can be controlled by a belt escapement magnet 58 (FIGS. 10 and 12).

As shown in FIG. 10, the motor 32 has a drive shaft 60 to which is attached a drive pinion 62 (FIG. 12). This drive pinion is in engagement with teeth 64 of the drive clutch structure 34 such that the drive clutch structure 34 is continuously driven. The drive clutch gear ring 64 rotates freely on the shaft 60. It is retained thereon by a gear 66 attached to the shaft 60 and a spring spider hub 68 which is also attached to the shaft 60.

The spring spider hub 68 has a plurality of spring fingers 70 which press a free plate 72 toward the right as viewed in FIG. 10. Disks of friction material 74 are disposed between the plate 72 and the drive clutch gear ring 34 and between the drive clutch gear ring 34 and the gear 66. The pressure applied by the spring fingers 70 is sufficient to permit the motor 32 to drive the gear 66 and consequently the drum 36 unless the gear 66 is held against rotation by the belt escapement mechanism in which event the clutch will slip.

The escapement mechanism comprises an escapement gear 76 which is fixed to a shaft 78 journalled in frame members 50 and 80. Also, fixed to the shaft 78 is an escapement ratchet wheel 82 which is under the control of an armature 84 operatively associated with the belt escapement magnet 58. Teeth of the escapement ratchet wheel 82 are formed such that the release of a tooth will result in the feeding of a single transverse row of the program belt 24 under the brush assembly 22. Thus, the sequential energization of the belt escapement magnet 58 will result in the controlled feed of the program belt 24. When the belt escapement magnet is held energized, the program belt will be driven continuously.

Also attached to the shaft 78 are a plurality of circuit breaker cams CB1, CB2 and CB3 (FIG. 10). CB1 (see also FIG. 15B) is a 14-lobe cam; CB2 (see also FIG. 15D) is a 1-lobe cam which closes its contact at 9-time of the cycle; and CB3 is a 1-lobe cam which closes its contact at 12-time of the cycle.

A 14 point emitter 86 (FIG. 10) is attached to the frame member 80 and is connected for operation to the left end of the shaft 8.

The drum 36 has a common circuit connection 88, as shown in FIG. 10. Any time, therefore, that one of the sensing brushes of the brush assembly 22, which has been inserted into the circuit by depression of its push button, encounters a hole in the program belt 24, an active circuit is established. The common brush 88 is carried by the transverse frame member 48. Also, attached to this frame member are a pair of lamps 90 and 92. These are arranged directly under the viewing slot 30 of the prompter casing. These lamps will illuminate the tape as it passes under the slot 30, such that the successive legends along the margin 26 thereof can be read.

The mechanism for feeding punch cards over the punch block in the punch station of the punch 14 is conventional and only so much thereof is shown in FIG. 13 to permit an understanding of the present invention without repeated reference to the aforementioned Gardinor et al. patent. In FIG. 13, a constantly rotating shaft 94 has fixed thereto a gear 96 which through an idler gear 98 drives a gear 100 freely mounted on a shaft 102.

The gear 100 is flanked on both faces by rings 104 of friction material, one of which rings abuts a drive disk 106 fixed to the shaft 102, and the other of which abuts a disk 108 which is free on the shaft. Bearing against the outer face of the disk 108 is a spring spider 110 which urges the parts towards the right as viewed in FIG. 13 against the drive disk 106, so that there is a frictional drive from the constantly running gear 100 through the friction rings 104 tending to drive the drive disk 106 and as a result thereof also the shaft 102 and a gear 112 fixed thereto.

The gear 112 meshes with a gear 114 secured on a stud shaft 116. The gear 114 drives a gear 118 fixed to a shaft 120. The gear 118, in turn, drives an idler gear 122 which is in driving engagement with a terminal gear 124 fixed to a shaft 126. An escapement wheel 128 is fixed to the shaft 126, and operatively associated therewith is an escapement control mechanism 130 consisting of a card feed magnet 132 and its associated armature 134. The free end of the armature 134 is normally biased into engagement with the teeth of the ratchet wheel 132 by means of a spring 136. So long as the armature 134 engages the teeth of the escapement wheel 128, the train of gears beyond the friction clutch device will remain stationary. However, when the card feed magnet 132 is energized, it will attract its armature 134 and permit the entire gear train to operate.

The shaft 102 has secured thereto a card feed wheel 138 which grips the front or lower edge of the card. A similar card feed wheel 140 is fixed to the shaft 136. The aligned peripheries of the card feed wheels 138 and 140 are serrated to permit them to grip the card as it is being fed forward. A pair of pressure rollers (not shown) are associated with the feed wheels 138 and 140 to permit these wheels to function as intended during the feeding of a card. Whenever the card feed magnet 132 is pulsed, it will permit the card feed wheels 136 and 138 to feed a punch card through the punch station a single column until the armature 134 engages the next tooth on the escapement wheel 128. When the magnet is held energized, the card feed wheels 136 and 138 will be rotated in a continuous manner with the result that the card is fed through the punch continuously rather than intermittently as is the case when it is fed in column-by-column progression.

The shaft 120 which is driven by the gear 118 has fixed thereto a punch program card drum 142. This drum is designed to hold a punch program card 144 wrapped thereabout. The character of a typical punch program card is shown in FIG. 9. Associated with the drum, as by mounting on a coaxial shaft 146, are a plurality of contact members 148 in the form of star wheels. Each of the contact members 148 is mounted for rotation at the forward end of a lever 150 pivoted on the shaft 146. The opposite end of each of the levers 150 overlies a wire contact 152 which is adapted for alternate engagement and disengagement of a contact stud 154 depending on whether or not a point of the star wheel is in or out of a hole of the punch program card. The star wheel sensing device is of the type shown and described in J. M. Cunningham United States Patent 2,517,984, issued August 8, 1950. With an imperforate portion of the card beneath any of the star wheels 148, the wheels rest thereon and, as a perforation in the card moves by, a tooth of the wheel will roll therein to be carried along by the edges of the hole to a point wherein the pivot point of the star wheel is dropped toward the center of the drum, permitting counterclockwise rotation of the lever 150 and consequent movement of the contact spring 152 into engagement with the contact stud 154.

Where there are perforations in the same row in successive program card columns, the star wheel 148 will drop into the first perforation and close contacts 152, 154. The wheel will then roll into the next perforation without elevating the pivot lever 150, and consequently the contacts 152, 154 will remain closed to the extent that there are successive adjacent perforations.

The program card 144 of FIG. 9 has punch program holes punched therein at rows 12 (first row from top edge of card), 1, 2 and 3. The five hole groups in row 12 define the six column fields of the punched card of FIG. 7. The spaced holes at row 2 are field check holes, and the holes at row 3 control the automatic punching of operator names in the NAME field of the punched card of FIG. 7. More will be said of these functions as the description proceeds.

The punching mechanism of FIG. 14 is conventional and it is shown in the aforementioned Gardinor et al. patent. Only so much thereof is shown in FIG. 14 as to render intelligible its operation in the present combination. The punch mechanism comprises a row of 12 punches only one of which is shown in FIG. 14. In FIG. 14, the punch comprises a vertically reciprocating structure 156 having a blade 158 operating in the throat of a punch block 160. The lower end 162 of the punch structure 156 is circular in cross-section, adapting it to reciprocate in a guide plate 164. The punch 156 is slotted to receive the rounded end of a punch operating lever 166. The punch operating lever 166 is freely pivoted on a rod 168. The left end of the punch operating lever 166 has an interposer in the form of a bell crank 170 pivoted thereto at 172. One end 174 of the interposer bell crank 170 normally engages with the slotted end of an armature 176 which is controlled by a punch selector magnet 180. A spring 182 serves to hold the end 174 of the interposer bell crank in engagement with the armature and it also serves to bias the punch operating lever 166 into the position shown in FIG. 14. Upon energization of the punch selector magnet 180, its armature 176 is rocked to release the interposer bell crank 170 which thereupon, under the influence of the spring 182, will rock in a clockwise direction to swing its hooked end 184 beneath a punch actuating bail 186.

Extending across the upper edge of the interposer bell cranks 170 is a pivoted bail 188 in such proximity to the interposer bell crank 170 that when the latter is released for clockwise rocking, it will strike the bail 188 and rock the same about its pivot to cause closure of a pair of contacts 190 which are located above the bail. The normal function of these contacts in the punch 14 is to bring about an escapement operation and a cycle or revolution of operation of a punch shaft 192 which carries the mechanism for effecting an oscillation of the punch actuating bail 186, so that the latter on being engaged by the ends 184 of the selected interposer bell cranks 170 will rock the associated punch lever or levers 166 counterclockwise to elevate the punch blade 158 through the record card lying on the punch block 160.

A motor driven shaft 194 is arranged to drive the shaft 192 through a one-revolution clutch 196. This clutch includes a spring 198 which is helically coiled about the shaft 192, and which has its opposite ends connected respectively to the shaft 194 and a sleeve 200. The sleeve 200 has a stop shoulder 202 which is adapted for engagement by the free end of an armature 204 associated with a punch magnet 206. Whenever the armature 204 is in engagement with the stop shoulder 202, the spring 198 is somewhat expanded and does not grip the shaft 192. However, when the armature is attracted to the punch magnet 206 when the latter is energized, it will release the shoulder 202 whereupon the spring 198 contacts into driving engagement with the shaft 192, thereby rotating the shaft 192 until the armature 204 again engages the stop shoulder 202. The parts just described constitute a well known form of one revolution clutch which forms no part of this invention.

The punch actuating bail 186 has an end yoke 208 on which is mounted a pair of cam followers 210 and 212. These cam followers are in contact respectively with a pair of complementary cams 214 and 216 mounted on the shaft 192. The cams 214 and 216 drive the punch 156 through an operative stroke each time the punch magnet 206 is energized and the armature 204 is disengaged from the stop shoulder 202 such that the shaft 192 is driven through one revolution.

Figure 3:
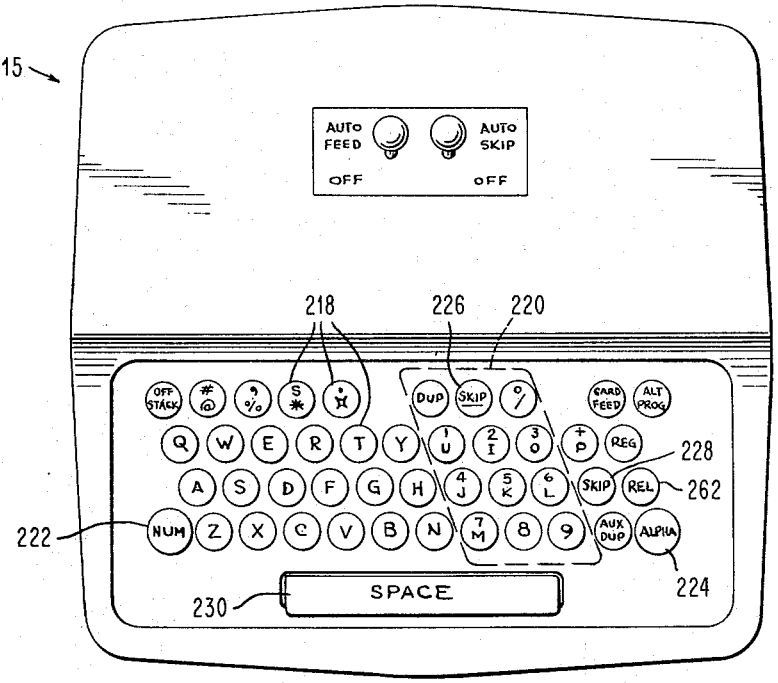
FIG. 3 is a plan view of the punch control keyboard.

The keyboard of FIG. 3 is a separate mechanical unit connected to the punch 14 through electrical connections. Its mechanical construction is similar to that of the keyboard shown in James A. Cunningham et al. United States Patent 2,566,931, issued September 4, 1951. The keys 218 are arranged in conventional manner for operation by a typist for the letters of the alphabet and the symbols in the lower half of the upper row of key caps. Thus, for alphabetic operation two hand manipulation is possible by a trained typist. The keys representing the numerals 1 through 9 are arranged within the outline 220 in three horizontal rows and four oblique columns for one hand operation by an operator trained in the use of the well known types of key punches.

A key 222 designated "NUM", when operated, will render the machine responsive to operation of the numeric section of the keyboard and to the upper special characters on others of the key caps. A key 224 designated "ALPHA", when operated, will render the machine responsive to the alphabetic keys 218. Among other keys is a skip key 228. A space bar 230 is also provided. Each of the keys is suitably supported for vertical movement and is normally biased upwardly by a spring (not shown). When the keys are operated, they will select for energization the various control magnets in the punch for punching the selected characters or for performing the control functions called for by the respective keys.

It should be pointed out in passing that the punch of the foregoing Gardinor et al. patent provides a group of wires (not shown) adjacent the punch block 160 constituting a so-called wire printer which is similar to that described and claimed in United States Letters Patent 2,524,127, issued to R. B. Johnson on October 3, 1950. Between the ends of the wires and the punch card is an ink ribbon through which impressions are made along the upper margin of the card. With the card positioned at the row of punches, as already explained, the punches will be operated singly or in combination to effect the code perforations, such as shown in FIG. 7. As each hole or combination of holes is punched in any column, the wires of the wire printer will be actuated to print a pattern of the character corresponding to the hole or combination of holes punched. The printing on the card is located along the upper margin, as shown in FIG. 7, wherein in the first field is punched the numeric value 184 by punching holes respectively at the 1, 8 and 4 rows, or index point positions. Simultaneously with the punching of each digit of the value "184", such digit is also printed along the upper edge of the card. In this same figure, the next field is combinationally punched in the Hollerith alphabetic code to identify a programming operation "SAVEX". As the several columns of this field are combinationally punched to represent alphabetic letters, the letters are printed along the top edge of the card.

The sensing of holes in the Mylar program belt 24 by the brushes of the wire brush assembly 22 initiates the various actions in the prompter unit 12. There are two basic modes in which the system may operate, i.e. the auto-punch mode and the prompting mode. The mode in which the system is to operate is dictated by holes punched at row 3 of the punch program card 144 (FIG. 9). If a series of holes are punched in row 3 of the program card, the star wheel 148 at that row will sense the holes and put the unit in the auto-punch mode. Otherwise, the unit remains in the prompting mode.

The auto-punch mode is used to automatically punch data into the punch card. When the operator selects a program block function by depressing a push-button in the push-button control panel 10, its wire brush is connected into the control circuit through a contact under control of the push-button, as stated. At the same time, another contact of the push button allows for the possible engagement of the belt escapement magnet 58 (FIG. 10) which is required to move the program belt 24. When in the auto-punch mode, the program belt moves along and the selected brush senses holes in its column. The hole positions sensed in the program belt are made to correspond to the hole positions of the card from top to bottom by passing the output of the sensing brush through the emitter 86 (FIG. 10). The emitter connects with each of the punch selector magnets 180 (FIG. 14) in turn so that it is possible to set any punch in a card column by sensing a hole in the program belt coming under a reading brush that has been selected by depression of its control push button in the push button control panel 10.

Since the normal punch operation initiates a punch cycle whenever an interposer bell crank 170 (FIG. 14) is set, it is necessary to break the leads to the punch interposer bail contacts 190 which usually trigger the punching cycle. Points 1 through 12 of the emitter 86 are used to energize the interposer control magnets 180 and to set the interposers 170. When the emitter rotor is at points 13 and 14, a pulse is sent to the punch magnet 296 through circuit breaker CB3 to engage the punch. Thus, it is possible to sense all possible hole positions, set the interposers and then punch the complete column. To sense and punch, a full column requires fourteen positions on the program belt 24. Therefore, to set a field of six characters requires a total of eighty-four possible positions. The emitter 86 is diagrammatically represented at the upper right of FIG. 15D.

When the punch reaches the beginning of the auto-punch mode field, as sensed by the star wheel 148 at row 3 of the program drum, the auto-punch mode relay 373 (FIG. 15C) is picked, putting the unit into the auto-punch mode. In this mode, the program belt 24 moves continuously and sends pulses from the sensed holes to the punch. The belt continues to move until the prompting mode is reached on the punch program drum 144, i.e. until the control holes at row 3 of the program card 144 have rotated beyond their star wheel.

In the prompting mode, i.e. when the holes at card 3 of the punch program drum 144 have rotated beyond their star wheel, the prompter unit 12 reacts differently to a hole sensed in the program belt. The sensing of a hole in the program belt while the system is in the prompting mode causes the belt escapement magnet 58 (FIG. 12) to be deenergized which causes the belt to stop. The hole to be sensed is so positioned that the belt will stop when the next prompting instruction appears in the prompting slot 30 of the prompter unit 12. Now the operator will key in the required data on the punch keyboard 15 and he will signal for the next instruction by depressing the skip key 228 on the punch keyboard 15. The belt escapement magnet 58 is again energized, so that the program belt resumes movement until the next hole is sensed by the brush which has been placed into the circuit. Thus, to cause a particular instruction to appear in the prompting window 30 for a block function, it is merely necessary to punch a hole in the program belt at the point which will stop the belt in position permitting the instruction to be read at the prompter slot 30.

This generally stated operation of the system will be made clear during the following more detailed description of its operation.

After the analyst has entered the functions for the GENERATE and ASSIGN blocks of his flow chart by punching corresponding cards, the program belt 24 will have been advanced such that the program instruction NEXT BLOCK FUNCTION is displayed in the prompter slot 30. The analyst, therefore, is reminded that he is to enter the data which is related to the next block of his diagram which, in this case, is the SAVEX block 184.

At the very outset of the operation, microswitches MS–1 and MS–2 were closed thus closing their several contacts. In the case of microswitch MS1 contacts MS1–1 through MS1–3 (FIG. 15A) are closed to supply power to the punch. In the case of microswitch MS2, its contacts MS2–1 through MS2–4 are closed thus supplying power to the prompter unit 12.

Each of the push buttons in the control panel has three contacts. These contacts are grouped in FIG. 15A as P.B. SECTION 1, P.B. SECTION 2 and P.B. SECTION 3. When a push button is pressed, its contact in P.B. SECTION 1 closes and connects its associated signal lamp into the energizing circuit. Its contact in P.B. SECTION 2 will be closed to energize the program belt escapement magnet 58 (FIGS. 12 and 15D). Closure of its contact in P.B. SECTION 3 will connect its program belt reading brush into the active circuit. Closure of contacts MS1–3 and MS2–4 will, respectively, turn on a PUNCH ON light 244 and a PROMPTER ON light 246 (FIG. 15A). These lights will illuminate the windows 244a and 246a, respectively, on the push button control panel (FIG. 2) to indicate that both the punch and the prompter are now conditioned for operation.

The program belt is now positioned to request the NEXT BLOCK FUNCTION [ ] by displaying the programming inquiry in the prompter slot 30. The operator, by reference to his flow diagram of FIG. 5, will see that the next block to be entered is the SAVEX block 184 and he will, therefore, depress the SAVEX button 288 (FIG. 7A) which will close the number 3 contacts in P.B. SECTION 1 to light the lamp 250 (FIG. 15A) which illuminates the SAVEX button 258 to show that it has been depressed. The number 3 contacts in P.B. SECTION 2 are also closed and this serves to energize the program belt escapement magnet 58 (FIG. 15D). A circuit is now completed through the normally closed points 376–2 of the belt stop relay 376 (FIG. 15D).

Since the program belt escapement magnet 58 is energized, the program belt 24 will be driven forward one space. At this time, as the belt is moving forward, the SAVEX brush at column 3 will encounter the hole 252 in the program belt (FIG. 8), and the belt will stop. This function is the result of a completed circuit from the SAVEX brush at column 3 through the roll 36, over normally closed contacts 375–9, 371–2, 372–1 and 379–9 (FIG. 15D), through the normally closed contact 376–1 of the belt stop relay 376. The belt stop relay 376 is held through its holding coil 376H. When the belt stop relay 376 is energized, it will open its normally closed contacts 376–2 (FIG. 15D) which break the circuit to the program belt escapement magnet 58. The belt escapement magnet 58, now being deenergized, will release its armature 84 (FIG. 12) to reengage the teeth of the escapement ratchet 82. The program belt will, therefore, now come to a halt.

At the same time, the circuit through the roll 36 is completed by brush 32 which senses a hole in the program belt. This closed circuit extends through normally closed contacts 373–3 (FIG. 15B) of the auto mode relay 373 and energizes the asterisk relay 372. Picking the asterisk relay 372 completes the path to the space interposer magnet in the punch (not shown) through contacts 390–4 (FIG. 15C) of the conditional relay 390, through normally open but now closed contacts 372–2 of the asterisk relay 372, normally closed contacts 378–4 of the conditional skip relay 378, normally closed contacts 391–9 of the field error relay 391 and the normally closed contacts 394–3 of the alpha punch relay 394, causing the punch to take a punch cycle thereby spacing the card therein over column 1 which receives no information.

It should be noted that the space interposer above referred to is in all respects like the interposer 170 of FIG. 14 with the exception that it does not include the latch 184 with the result that it cannot engage the punch bail 186. When its magnet is energized, the space interposer is released to strike the pivoted bail 188 and close its contact 190 to initiate a punch cycle by energizing the punch magnet 206. This punch cycle causes the card to advance to column 2.

Energization of the asterisk relay 372 will cause its normally closed points 372–1 to open and this will break the circuit to the hold coil 376H of the belt stop relay 376 (FIG. 15D). When the belt stop relay 376 is dropped, it reenergizes the escapement magnet 58 by permitting its contacts 376–2 (FIG. 15D) to close which will effectively reestablish the circuit of the escapement magnet. The belt will now move forward and will continue to move forward until the SAVEX brush encounters hole 254 in the program belt.

When the SAVEX brush encounters the hole 254 in the belt, the belt will stop as previously described, and the prompting instruction LOCATION will appear in the prompter slot 30. At this time the operator will consult the prompter and he will find that he is being asked the location of the SAVEX block function which he has just initiated. By further reference to FIG. 5, he will see that the block number is 184. Thereupon, the operator will manipulate the punch keyboard by depressing the 1, 8 and 4 keys in the order named. Having done so, he will depress the skip key 228 (FIG. 3). The skip key renders post 66 (FIG. 15C) active. A current is, therefore, delivered through normally closed contacts 391–3 of the field error relay 391 and this will energize the skip key relay 374 (FIG. 15C). In FIG. 15D, the normally open contacts 347–6 of the skip key relay 374 will close and energize the escapement magnet 58, causing the program belt to proceed until the next hole therein is encountered by the SAVEX brush. By reference to FIG. 8, it can be seen that this hole is the FIELD ERROR hole 256.

In addition to advancing the program belt, operation of the skip key 228 will also cause advance of the card in a normal manner under program control.

Since the two mechanical devices, the punch and the prompter unit, are asynchronous, there must be means to assure that the two units are operating in the same field. In other words, it is necessary to monitor the system by periodic checks to assure that the several items of information are recorded in their proper respective fields. To this end, the punch program card 144 of FIG. 9 has holes punched at spaced points in line 2. These holes are preferably punched at the end of logical fields. Thus, in the example of FIG. 9, the field error check holes of line 2 are at columns 6, 18, 36, 54 and 67 corresponding respectively to the end of the LOCATION field, the end of the NAME field, the end of the Z field, the end of the NEXT BLOCK B field and at the end of the MODIFIER field. Corresponding holes are punched at corresponding logical positions of the program belt 24. In FIG. 8, hole 256 is one of such holes corresponding to the hole at column 6 of the card in FIG. 9.

The sychronization above referred to is tested by means of a pair of counters (FIG. 15C) controlled respectively by a belt field counter relay 400 (FIG. 15B) and a drum field counter relay 401. These are stepping relays which at each impulse will step the counters (FIG. 15C) one position. These counters are compared against each other when a program belt reading brush enters a field error hole in the program belt, such as the hole 258 in FIG. 8, for example. Specifically, this operation proceeds as follows: A circuit is completed from the brush 46 at the hole 258 of the belt, through normally closed contacts 373–8 (FIG. 15B) of the auto mode relay 373, through normally closed contacts 375–10 of the end of belt relay and through normally closed contacts 377–3 of the conditional step relay to the belt field counter relay 400. When this relay is energized, the belt field counter (FIG. 15C) will be advanced one position.

When the card sensing star wheel at line 2 of the punch program card enters the hole at column 6, it completes a circuit from the drum star 2 contact (FIG. 15C) to the drum field count relay stepping coil 401 (FIG. 15C) which will step the drum field counter one position. The settings of the belt field counter and the drum field counter are compared as follows: As the counter relay 400 was stepped, the count stop relay 386 (FIG. 15C) was also energized. By the same token, when the counter 401 was stepped, the drum field count relay 385 was energized. Picking of the count stop relay 386 completes a circuit through the normally closed contacts 380–4 of the instruct repeat relay. This circuit is extended through the normally closed contacts 370–4 of the field skip relay, normally open but now closed contacts 386–1 of the count stop relay, normally closed contacts 377–4 of the conditional stop relay, normally open but now closed contacts 376–3 of the belt stop relay, normally closed contacts 334–1, normally open contacts 384–2 of the field compare relay which have now been closed by reason of the fact that a drum field counter and the belt field counter are at the same count and contacts 385–3 (FIG. 15C) of the field drum counter relay are closed. Each picks the escapement magnet 58 causing the belt to be placed into motion. If the drum field counter and the belt field counter are not at the same count, a circuit will be provided at normally closed contacts 384–2 of the field compare relay to turn on a field error check light (FIG. 15D). At the time the field error check light is turned on, the field error relay 391 is picked. When the contacts 391–2 (FIG. 15D) of the field error relay are opened, they break the interposer bail circuit between the contact 190 (FIG. 14) and the punch magnet 206, so that depression of any keys in the keyboard will not cause a punch cycle. Under these conditions, the only key which may be depressed is the release key 262 (FIG. 3) which will serve to release the program belt and the card. The release key 262 activates the belt run-out relay 371 (FIG. 15D) which opens its contact 371–2. With this contact open, all other control brushes are rendered ineffective such that the program belt proceeds to the end of the belt. At the same time, the release key 262 has performed its normal function in respect to the punch by releasing the card and feeding a new one into the punch.

When the end of the belt position is reached, brushes 34, 45 and 46 will sense holes in the program belt. A circuit is completed through the normally closed contacts 378–3 of the conditional skip relay, the normally closed contacts 373–5 of the auto mode relay, through brush 34, through the roll 36 and to brushes 45 and 46. Brush 45 delivers current to the normally closed contacts 373–2 (FIG. 15B) of the auto mode relay and to the normally closed contacts 377–2 of the conditional stop relay to pick the field skip relay 370. With the field skip relay 370 picked, brush 46 will energize the end of belt relay 375. Energization of the end of belt relay 375 causes the push button restore magnet 264 (FIG. 15A) to release the depressed push button on the control panel. The belt run-out relay 371 (FIG. 15D) during this time is held energized through a microswitch 3A which is now opened as the push button release solenoid drops out the belt run-out relay 371, thus completing the belt restoration operation. The end of belt relay 375 (FIG. 15B) at the same time also resets the drum field counter and the belt field counter to their reset position. The auto punch mode relay 373 (FIG. 15C) will have been picked by reason of the fact that the punch program drum star wheel for row 3 of the program card (FIG. 9) has sensed a hole at column 6. The contact established by the star wheel is, however, ineffective so long as the field compare relay 384 is deenergized. However, since the field compare relay 380 is energized by the successful field checking operation, the star wheel contact is effective to energize the auto mode relay 373 and take the operation from the prompting mode and placing it into the auto punch mode.

The program belt reading brush will now no longer stop the program belt when a hole therein is sensed by the brush. The belt is allowed to run continuously through the auto punch mode. Now when a hole is sensed in the program belt by the reading brush, a pulse is sent to the emitter 86 (FIGS. 10 and 15D) which, in turn, has its contacts connected to the punch selector magnets 18 (FIG. 14) in the punch. It should be noted that the operation of the emitter 86 is synchronous with the movement of the program belt through the fields such that the emitter is at the 12th position immediately after the field error operation at the next row of the belt. As a result, the reading of holes in the program belt during this interval is comparable to the sequential scanning of the index points comprising a card column. Consequently, as the program belt of FIG. 8 continues to move, the SAVEX brush will first sense a hole at the zero index point which will result in the sending of a pulse through the emitter which, at this time, is electrically connected with the punch selector magnet in control of the zero punch interposer. As explained above, this will not immediately result in the punching of a hole. As the belt moves forward, a second hole is sensed by the SAVEX brush at index point 2. Since the emitter is now electrically connected to the punch selector magnet in control of interposer 2, this magnet will also be energized. The 0 and the 2 in the Hollerith code is the letter "S". The interposers for punching the letter "S" have, therefore, been selected and their latches 174 (FIG. 14) have been released. At 9-time of the punch cycle, a pulse is sent through circuit breaker CB3 (FIG. 15D) which is effective to energize the punch cycle relay 392 thereby initiating the punch operation by energizing the punch magnet 206 to punch holes in the card at index point positions corresponding to the holes sensed in the program tape.

The above described action will be repeated as long as the star wheel continues to sense holes at row 3 of the punch program card 144. The auto punch mode area of the program tape 24 will naturally be somewhat longer than that shown in FIG. 8 since 84 rows of tape are reserved to punch a 6-column field of the card. In the case of the SAVEX operation, the letters A V E X remain to be punched and will be so punched in the same manner as described with respect to the letter "S". Since the name field is a 6-column field and the word SAVEX requires only 5 columns, no interposers will be set for the 6th column with the result that that column will not be punched.

Upon completion of the punching of the sixth character in the name field, the star wheel at row 3 of the punch program card will no longer be sensing a hole. Therefore, the auto mode relay 373 (FIG. 15C) will be deenergized to shift the system from the auto punch mode to the prompting mode. When so shifted, the program belt will stop at the next hole which is sensed by the SAVEX brush by reason of the fact that the belt stop relay 376 will be energized, opening its normally closed points 376–2 (FIG. 15D) and thereby breaking the circuit to the belt escapement magnet 58.

In this case, by reference to FIG 8, it can be seen that the next hole to be encountered is hole 268 which is sensed by brush 45. When this hole is encountered, the field skip relay 370 (FIG. 15B) will be energized. The field skip relay 370 picks the skip key relay 374 which initiates a skipping operation as though the skip key 228 had been depressed. As a result, the escapement magnet 58 is again energized and the program belt advances until the SAVEX brush encounters the next hole in the belt, which by reference to FIG 8, is the hole 270 associated with FIELD ERROR. Now the same field error checking sequence ensues, as described above, for a second field count.

As the program belt is again placed in motion by a successful field check, it advances to hole 272 associated with the prompting instruction (*) SAVEX CELL NUMBER (±).

The operator will now refer to his block diagram of FIG. 5 to ascertain the SAVEX cell number which is to be keyed in at this point. He therefore, keys in *4. Having keyed in this number, he strikes the skip key 228 on the keyboard which causes the same sequence that was performed following the entry of LOCATION. As the belt advances, the next hole, namely, 274 associated with the prompting inquiry SV(*)NUMBER, will be encountered. This is a further question pertaining to the data of the SAVEX block of FIG. 5, i.e. referring to the SAVEX value Q10. The operator will key in the value Q10 on the punch control keyboard, and upon striking the skip key 228, the belt will again advance as per the above sequence, until the [SKIP] hole 276 is sensed by the SAVEX brush. This initiates the same sequence ensuing from the sensing of the hole 266 with the result that the card will be advanced to the (SELECTION MODE) field, having skipped the Z field. This skipping operation is under control of brush 45 which senses hole 278 in the program belt. A circuit is completed from the brush through the normally closed contacts 373–2 of the auto mode relay 373, through the normally closed contacts 377–2 of the conditional stop relay 377 and to the field skip relay 370 (FIG. 15B).

As the belt moves forward, it is stopped at FIELD ERROR by reason of the SAVEX brush sensing hole 280. At this time, the brush 46 will sense hole 282 which effectively initiates the field checking operation as explained in conjunction with the same operation which occurred earlier when hole 258 was sensed.

As the program belt now advances, the SAVEX brush will sense hole 284 which will stop the belt to display the programming inquiry (SELECTION MODE) at the prompter slot 30.

The operator will now refer to his program diagram of FIG. 5 to see whether a selection mode is associated with SAVEX block 182. He notes that his selection mode is BOTH. This comprises means for choosing between the COMPARE block 186 and the ASSIGN block 182. If the conditions of the COMPARE block 186 are met, the exit will be to that block; if not, however, the particle will be returned to the ASSIGN block 182 for further processing.

Having keyed in the selection mode BOTH and having struck the skip key 228, the program will advance until the SAVEX brush encounters control hole 228 which is associated with the programming inquiry NEXT BLOCK A. The operator will again consult his programming diagram of FIG. 5 to see that he is to key in the number 186 which identifies the COMPARE block and which comprises his next block "A". He will then hit the skip key, with the result that the belt will advance until the SAVEX brush encounters the next hole, which, in FIG. 8, is hole 290 associated with the prompting instruction NEXT BLOCK B. When the program belt stops as a result of the sensing hole 290, the operator will observe the prompter slot 30 and he will see that the instruction inquiry NEXT BLOCK B is on display. Again, by reference to his diagram of FIG. 5, he ascertains that the next block "B" number is 182, which identifies the ASSIGN block. The number 282 will be keyed in on the punch keyboard and the operator will then strike the skip key 182, such that the program belt will advance to the next SAVEX brush hole 292 which is associated with FIELD ERROR thereby stopping the belt. At this time, brush 46 will sense hole 294 to initiate a field error check. The field error checking operation will ensue in the same fashion as described in respect to the operation performed when hole 258 was first sensed. As the program belt now advances, following a successful field error check, the SAVEX brush will next encounter hole 296, which is associated with the programming inquiry (MEAN TIME), and which will be displayed at prompter slot 30. By reference to his block diagram, the operator will see that the mean time is 10 (derived from the SAVEX block 184). He will key in the numeral 10 and knowing that he has no further information to be punched into this particular card, he will strike the release key 262 (FIG. 3) which will cause the feed-out of the card and the indexing of the belt to the end of belt position. The next operation in sequence may then be initiated by depressing the compare button 290 (FIG. 7A). As the COMPARE block 186 of the programming diagram is processed, many of the same operations encountered during the processing of the SAVEX block will be repeated, others of a similar nature may be added.

In some cases, conditions are set in one field which affect the requirements of one or more of the following fields. For example, in respect to fields "X," "Y" and "Z," it might be stated that if data is entered in field "X," then proceed to field "Y" and then to field "Z." However, if no data is entered in field "X," skip fields "Y" and "Z," and proceed to the next field beyond. This operation is controlled by brush 44 which will sense holes in the program belt, herein designated as holes 298 and 300 which are associated, respectively, with the (SELECTION MODE) and the (MEAN TIME) programming inquiries, for example. The conditional skip function is under control of a conditional skip relay 377 (FIG. 15B) which is picked up having a hole punched for brush 44 as well as for any brush of a block which requires these rules. The operation requires a determination of whether data is entered in a field. As for normal use, row 12 of the program drum card has a hole punched in all positions except the columns which start a new field. When the conditional skip relay 377 is picked, the prompter senses if data is entered by sensing whether the skip key is hit while star wheel 12 of the program drum is not sensing a hole (which would means the first column of the new field). If the skip key is depressed while in this first column, no data has been entered and both the punch and the program belt skip beyond the other conditional fields in a manner previously described for skipping a field. If the skip key is hit while sensing a 12 hole (data has been entered), then the program belt and punch will both stop at the next field. This can be further illuminated by a specific reference to the sequence resulting from the sensing of the hole 300 associated with the prompting instruction (MEAN TIME).

Two general conditions may exist. Either there is or there is no mean time. If there is a mean time, there may be a modifier and, therefore, the question as to modifier must be asked of the analyst. However, if the analyst does not enter a mean time, it obviously can not have a modifier. Therefore, the question is irrelevant and should not be asked of the analyst. In the first case when the SAVEX brush reaches hole 296, the analyst is asked for a mean time. In conjunction with hole 296, hole 300 is sensed by brush 44. When the analyst enters data in this field, and then hits the skip key, he establishes the conditions for picking a conditional skip relay 377 (FIG. 15B). The belt now advances to the programming inquiry (MODIFIER) with the result that the SAVEX brush will sense hole 302, and the skip brush 45 will sense hole 304. This brush would normally cause the picking of the field skip relay 370 (FIG. 15B), but the conditional skip relay 377 is now picked which suppresses the skipping of this field, and allows the analyst to enter his data, if any, into the modifier field. Upon the entering of this data, the operator depresses the skip key and the program belt advances to the FIELD ERROR function where the SAVEX brush encounters hole 303 through which the conditional skip relay will be reset. The sum of this is that the modifier field between columns 61 through 66 is not automatically skipped.

If, while the program belt was stopped with hold 296 under the brush and the skip key was then depressed without entering any data, the conditional skip relay 377 would not be picked, so that when the program belt advanced to hole 302 at the (MODIFIER) field, hole 304 would now cause the picking of the field skip relay 370 causing the belt and the key punch to advance to the next field.

Whether or not any data has been entered in the mean time field is sensed by the fact that the drum row 12 relay 379 is picked when the skip key is depressed. The drum row 12 relay 379 is picked by the 12 star wheel, indicating that the punch is in the first column of a field. It should not be implied from the use of the specific example that the conditional skip function is applicable only in conjunction with the (MEAN TIME) programming inquiry. It is obvious that the function can be introduced at any desired point by providing a hole for the skip brush 44.

One feature of a typical punch is found to be undesirable in the operation of the system herein. That is, when a field has been completely filled with data, the operator must avoid hitting the skip key to advance to the next field since the punch is already at that field. However, in order to advance the belt to its next instruction, it is necessary to strike the skip key. A further problem can arise if the new instruction in the prompter slot after striking the skip key calls for no data to be entered. Thus, the operator would again hit the skip key. This time it is essential that both the key and the punch advance to keep them synchronized.

By sensing row 12 of the program card, it can be determined if the punch is in the first column of the field. If it is not, then hitting the skip key will advance both the belt and the punch. However, if the punching operation has completely filled the previous field and is, therefore, at the start of the next field, a contact of the drum row 12 relay 379 opens in the punch skipping circuit, preventing the skipping of the punch to a wrong field.

At the same time, a binary counter made up of a counter X relay 381 and a counter Y relay 382 (FIG. 15C) is advanced to pick a counter hold relay 383 (FIG. 15B). This provides an alternate path in the punch skipping circuit, so that any subsequent striking of the skip key will advance both the belt and the punch. This alternate field can be traced as follows: From terminal post 67 in the punch (FIG. 15C), through the normally open, but now closed, contact 374–2 of the skip relay 372, and through the now closed counter hold relay points 383–2 onto terminal post 91 in the punch which is connected to the conventional skip relay in the punch.

If at any time a punch cycle is taken, i.e. data is entered, the punch cycle relay 392 is energized thereby opening contacts 392–2 (FIG. 15C) in the counter circuits to deenergize counter X and counter Y relays 381 and 382 (FIG. 15C).

It is sometimes necessary to repeat the same instructions many times. For example, when using the "function" definition card, it is necessary to repeatedly list x-coordinate, y-coordinate, x-coordinate, y-coordinate, etc. To accomplish this, a hole is punched in the program belt for the function brush (36) at the proper instruction. At the same time, an additional hole is sensed by another brush (33) which trips an instruct repeat relay 380 (FIG. 15B) to prevent further advancing of the belt by opening its points 380–2 in the circuit of the escapement magnet 58. The prompter slot is illuminated by two lamps 90 and 92 (FIG. 10)—one on the left side, the other on the right side of the slot (see also Instruct 1 and Instruct 2—FIG. 15C). Both instructions, x-coordinate and y-coordinate appear in the slot. For this instruction only one light is lit at a time so that one instruction is highlighted. After the operator keys in the data and strikes the skip key 228, the punch advances to the next field, but the belt remains at the same instructions. Instead, the light for the second instruction is illuminated while the first light goes out. With each depression of the skip key as new data is entered, the light alternates from one side to the other. This effect is achieved by a binary counter made up of a counter Q relay 388 and a counter R relay 389 (FIG. 15C). Data can be entered in this manner through several cards. The condition can be removed by striking the release key 306 on the keyboard which returns both the belt and the punch to a start position. (This release function is the normal release function above described.)

A programmed card release follows upon encountering a 33-hole, a 45-hole and a 46-hole which are picked, respectively, to instruct repeat relay 380, the field skip relay 370 and the end of belt relay 375. The picking of the instruct repeat relay 380 suppresses the restoration of the push buttons by breaking the line to the push button release solenoids 264 and the belt advances to the next hole. It is to be noted that any function brush hole will initiate a release operation in the key punch.

Depressing the push button 36 allows the operator to enter any data he chooses on the card. This included the block description field which is usually automatically punched. Pressing button 36 energizes the no auto-punch relay 378 (FIG. 15C) which prevents the punch from shifting into the auto-punch mode by disabling the auto-punch mode relay 373. After this, the punch proceeds to stop at each field in turn in a manner similar to a normal punch.

It is often required that an asterisk be punched in column 1 of a field. This is accomplished by having an asterisk relay 390 (FIG. 15B) energized by any brush for which an asterisk is required plus a special asterisk brush 32. Contacts of this relay set interposers for the 8, 11 and 4 punches which is the Hollerith Code for the asterisk. As the belt continues to advance, a pulse is sent to punch either an asterisk or a blank in the column. In either case, the punch cycle advances the card to column 2. A condition relay 390 (FIG. 15B) sets up the condition for setting the interposers to punch an asterisk, and the asterisk relay 372, as explained previously, causes a punch cycle to be taken to actually punch the combination asterisk code into the card.

When the belt is in motion, a contact 308 on the energized escapement electromagnet 58 is closed (FIGS. 12 and 15C). This contact connects to the keyboard restore magnet (not shown) of the punch. Since this keyboard restore magnet remains active as long as the belt runs, the keyboard is effectively locked out to prevent entry of the data until the belt stops.

From the foregoing, it can be appreciated that the invention herein provides a programming aid which constitutes a functional substitute for the heretofore troublesome and error-ridden coding sheet step in the construction of computer and data processing system program. It allows the programmer to key data directly to a computer or data processing system, or to punch cards directly under the guidance of sequential prompting impurities by the system as to data requirements of the several program functions.

These advantages, it is shown, are obtained in a simple system which makes provision for automatically entering some of the data under program control; in a system which provides for automatic field and data alignment and field skipping, while periodically checking on the synchronization of the data processor and the prompter unit; and in a system which otherwise embodies additional features which adapt it completely to its intended purpose.

While the invention has been illustrated and explained in a single physical embodiment, viz, as an adjunct to a key controlled card punch, it is evident that the advantages of the invention can be enjoyed by resort to physical means which depart from the specific embodiment and in combination which are not so limited, it being the broad objective of the invention to provide a programming terminal which may be usefully employed in connection with computers and data processing systems, whereby programming data may be entered directly into such systems.

What is claimed is:

1. In a programming system, a prompter unit having therein a program tape bearing thereon notation of computer functions and successive spaced program inquiries concerning data relating to said functions, means in said unit for displaying said notations at a preselected display location, means for advancing said tape to display successive of said notations at said preselected display location, means for halting advance of said tape as each of said notations is displayed at said preselected display location, a data processing unit, means responsive to the entry into said data processing unit of data required by said notation for advancing said tape to display the next notation thereon at said preselected display location and means in said system conjointly operable by the entry of data into said data processing unit and the advance of said tape for manifesting synchronous advance of said tape and the entry of data into said data processing unit.

2. The system of claim 1, wherein said program tape is translucent is in the form of an endless belt, and has means associated therewith for illuminating said notations thereon.

3. The system of claim 1, wherein said tape advancing means is under control of holes punched in said tape.

4. The system of claim 1, wherein said tape is advanced under control of electromagnetic means and said last-named means is controlled by holes in said tape which are related to said notations.

5. The system of claim 1, having means under control of said tape for entering data into said processing unit.

6. The system of claim 5, wherein said last-named means includes character representing holes punched into said tape, and said prompter unit contains means in association with said tape for sensing said holes.

7. The system of claim 1, having means for advancing said tape continuously, in combination with means under control of said tape operative during continuous advance thereof for entering data into said data processing unit.

8. The system of claim 7, wherein said means for entering data into said data processing unit comprises control holes punched into said tape, and means in said prompter unit associated with said tape for sensing said holes.

9. The system of claim 1, wherein the means for halting advance of said tape as each of said notations is displayed at said display location is under control of said tape.

10. The system of claim 1, in combination with means under control of said data processing unit for causing continuous advance of said tape for a predetermined length thereof.

11. In a programming system, a prompter unit having therein a program tape bearing thereon notation of computer functions and successive spaced program inquiries concerning data relating to said functions, means in said unit for displaying said notations at a preselected display location, means for advancing said tape to display successive of said notations at said preselected display location, means for halting advance of said tape as each of said notations is displayed at said preselected display location, a key controlled card punch electrically connected to said prompter unit, means responsive to the entry into said punch of data required by said notations for advancing said tape to display the next notation thereon at said preselected display location, and means under control of both said tape and said punch for determining when said tape and said punch are in phase with each other.

12. The system of claim 11, in combination with means for restoring the phase relationship of said tape and said punch.

13. The system of claim 11, wherein said tape has a zone having character representing holes punched therein, said prompter unit has punch control means for sensing said holes, in combination with means under control of said punch for continuously advancing said tape through said zone whereby said punch is controlled by said character representing holes of said tape to punch corresponding character representing holes into a punch card in said punch.

14. The system of claim 11, wherein said tape has control holes punched therein in association with each of said program inquiries, and said prompter unit has means for sensing said holes connected to said means for advancing said tape, whereby advance of said tape is halted at each of said program inquiries.

15. The system of claim 11, in combination with means under control of said punch for advancing said tape.

16. In a programming system, a prompter unit having therein a program tape bearing notation of a plurality of computer functions and successive spaced unique program data inquiries related to each of said functions, means in said unit for displaying said notations and data inquiries at a display location, means for selectively advancing said tape to display a selected function and its related program inquiries at said display location, means for halting advance of said tape as each of said data inquiries is at said display location, a data processing unit, and means responsive to the entry into said data processing unit of data required by said data inquiries for advancing said tape to display the next data inquiry thereon at said display location.

17. The system of claim 16, in which a unique selecting means is activated for each of said computer function notations on said tape.

18. The system of claim 16, in which said selecting means is under control of holes in said tape which are unique to each of said computer function notations on said tape.

19. The system of claim 18, in which said prompter unit has therein a separate tape hole sensing brush associated with each of said computer function notations whereby said tape holes associated therewith are sensed.

20. The system of claim 19, in which said sensing brushes are each adapted for selective connection into the active control circuit.

21. In a data entry system for data processors, a prompter unit having therein a program tape bearing notation of a plurality of data processing functions and successive spaced unique program data inquiries related to said functions, means for advancing said tape to display a selected function and its related program inquiries, means comprising an aperture in said tape for halting advance of said tape as each of said data inquiries is advanced thereby, a data processing unit, means for entering data into said processing unit in response to said data inquiries on said tape, and means responsive to the entry into said data processing unit for advancing said tape to display the next data inquiry thereon.

22. In a data entry system for data processors, a prompter unit having therein a program tape bearing notation of a plurality of data processing functions and successive spaced unique program data inquiries related to said functions, means for normally advancing said tape to display successive functions and their related program inquiries, means for halting advance of said tape as each of said data inquiries is advanced thereby, a data processing unit, means for entering data into said processing unit in response to said data inquiries on said tape, means responsive to the entry into said data processing unit for advancing said tape to display the next data inquiry thereon, means for interrupting the normal advance of said tape when the same instructions are to be entered repeatedly, and operator controlled means effective to reestablish normal advance of said tape.

23. The system of claim 22, in which said tape advance interrupting means is under control of said tape.

24. The system of claim 22, in which a pair of signals become operative when said tape advance interrupting means is rendered effective for indicating which of two instructions are to be entered.

25. In a data entry system for data processors, a prompter unit having therein a program tape bearing notation of a plurality of data processing functions and successive spaced unique program data inquiries related to said functions, means for advancing said tape to display a selected function and its related program inquiries, means for halting advance of said tape as each of said data inquiries is advanced thereby, a data processing unit, means under control of said tape for entering data into said processing unit in response to said data inquiries on said tape, operator controlled means for disabling said tape controlled data entering means, and manually operated means for entering data into said processing unit when said tape controlled data entering means is disabled.

26. In a data entry system, a prompter unit having therein a program tape bearing thereon notation of data processing functions and successive spaced program inquiries concerning data relating to said functions, means for advancing said tape to display successive of said notations at a preselected display position, means comprising an aperture in said tape for halting advance of said tape as each of said notations is displayed at said preselected display location, a card punch electrically connected to said prompter unit, means for advancing a punch card through said punch, and means responsive to the entry into a card in said punch of data required by said notations for advancing said tape to display the next notation thereon at said preselected display location.

27. In a data entry system, a prompter unit having therein a program tape bearing thereon notation of data processing functions and successive spaced program inquiries concerning data relating to said functions, means for advancing said tape to display successive of said notations at a preselected display position, means for halting advance of said tape as each of said notations is displayed at said preselected display location, a card punch electrically connected to said prompter unit, means for advancing a punch card through said punch, means under control of said tape for advancing a punch card in said punch over selected fields thereof while suspending the card punching operation of said punch, and means for concurrently advancing said tape a corresponding distance.

28. In a data entry system, a prompter unit having therein a program tape bearing thereon notation of data processing functions and successive spaced program inquiries concerning data relating to said functions, means for advancing said tape to display successive of said notations at a preselected display position, means for halting advance of said tape as each of said notations is displayed at said preselected display location, a card punch electrically connected to said prompter unit, means for advancing a punch card through said punch, first means under control of said tape for conditioning said punch for advancing a card therein through a plurality of fields thereof, means for detecting the punching of data in a first card field, and means conjointly under control of said last named means and said first means for advancing a card in said punch through a second card field when said detecting means fails to sense data in said first card field.

29. In a data entry system, a prompter unit having therein a program tape bearing thereon notation of data processing functions and successive spaced program inquiries concerning data relating to said functions, means for advancing said tape to display successive of said notations at a preselected display position, means for halting advance of said tape as each of said notations is displayed at said preselected display location, a card punch electrically connected to said prompter unit, key operated means for advancing a punch card through said punch, means for sensing when said punch is in the first column of a card field, and means responsive to said last named means when sensing the first column of a card field for disabling said key operated card advancing means, and means responsive to the operation of said key operated means for advancing said tape to the next position.

30. The system of claim 29, in which an alternate control circuit is provided to correspondingly advance said tape and said card when no data is to be entered in the card field at which said punch is located.

31. In a data entry system, a prompter unit having therein a program tape bearing thereon notation of data processing functions and successive spaced program inquiries concerning data relating to said functions, means for advancing said tape to display successive of said notations at a preselected display position, means for halting advance of said tape as each of said notations is displayed at said preselected display location, a card punch electrically connected to said prompter unit, a keyboard connected to said card punch for the control of the latter, means for advancing a punch card through said punch, means responsive to the entry into a card in said punch of data required by said notations for advancing said tape to display the next notation thereon at said preselected display location, and means for disabling said keyboard while said tape is advancing.

32. In a data entry system, a prompter unit having therein a program tape bearing thereon notation of data processing functions and successive spaced program inquiries concerning data relating to said functions, means for advancing said tape to display successive of said notations at a preselected display position, means for halting advance of said tape as each of said notations is displayed at said preselected display location, a card punch electrically connected to said prompter unit, means for advancing a punch card through said punch, means responsive to the entry into a card in said punch of data required by said notations for advancing said tape to display the next notation thereon at said preselected display location, means under control of said tape for sensing when the latter has completed a full cycle, a release circuit in said punch adapted to initiate a new punch cycle, and means under control of said tape cycle sensing means adapted to energize said release circuit whereby a new punch cycle is initiated.

References Cited by the Examiner
UNITED STATES PATENTS

| | | | |
|---|---|---|---|
| 2,800,539 | 7/1957 | Edminster et al. | 234—20 X |
| 3,208,160 | 9/1965 | Smith | 234—40 X |

WILLIAM S. LAWSON, *Primary Examiner.*